United States Patent
Yang et al.

(10) Patent No.: US 11,258,708 B2
(45) Date of Patent: Feb. 22, 2022

(54) COMMUNICATION METHOD AND COMMUNICATIONS APPARATUS

(71) Applicant: Huawei Technologies Co., Ltd., Shenzhen (CN)

(72) Inventors: Jiao Yang, Xi'an (CN); Tingfang Tang, Shenzhen (CN); Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 161 days.

(21) Appl. No.: 16/561,163

(22) Filed: Sep. 5, 2019

(65) Prior Publication Data

US 2019/0394128 A1 Dec. 26, 2019

Related U.S. Application Data

(63) Continuation of application No. PCT/CN2017/075991, filed on Mar. 8, 2017.

(51) Int. Cl.
```
H04L 12/745    (2013.01)
H04L 12/721    (2013.01)
H04L 45/748    (2022.01)
H04L 45/00     (2022.01)
H04W 80/10     (2009.01)
```

(52) U.S. Cl.
CPC ............ *H04L 45/748* (2013.01); *H04L 45/72* (2013.01); *H04W 80/10* (2013.01)

(58) Field of Classification Search
CPC ....... H04L 45/748; H04L 45/72; H04W 80/10
See application file for complete search history.

(56) References Cited

U.S. PATENT DOCUMENTS

| | | |
|---|---|---|
| 2012/0246325 A1 | 9/2012 | Pancorbo Marcos et al. |
| 2014/0013383 A1 | 1/2014 | Pancorbo-Marcos et al. |
| 2014/0307651 A1 | 10/2014 | Sarikaya et al. |
| 2015/0052247 A1 | 2/2015 | Threefoot et al. |
| 2016/0205064 A1 | 7/2016 | Yan et al. |
| 2017/0201453 A1 | 7/2017 | Deng |

(Continued)

FOREIGN PATENT DOCUMENTS

| | | |
|---|---|---|
| CN | 102958128 A | 3/2013 |
| CN | 103444148 A | 12/2013 |

(Continued)

OTHER PUBLICATIONS

ZTE, TS 23.501 Correction on Routing rulesconfiguration. SA WG2 Meeting #119, Feb. 13-17, 2017, Dubrovnik, Croatia, S2-171122, 2 pages.

(Continued)

*Primary Examiner* — Luat Phung
(74) *Attorney, Agent, or Firm* — Conley Rose, P.C.

(57) ABSTRACT

A communication method and a communications apparatus, where the method includes: assigning, by a control plane device, an Internet Protocol (IP) address to a user equipment; obtaining, by the control plane device using a routing policy network element, a routing rule corresponding to the IP address; and sending, by the control plane device, the routing rule and the IP address to the user equipment, where the routing rule is used by the user equipment to determine a source IP address when the user equipment initiates a service.

20 Claims, 13 Drawing Sheets

(56) References Cited

U.S. PATENT DOCUMENTS

| | | | | |
|---|---|---|---|---|
| 2018/0310350 A1* | 10/2018 | Stojanovski | .......... | H04W 36/12 |
| 2019/0394128 A1* | 12/2019 | Yang | ....................... | H04L 45/72 |

FOREIGN PATENT DOCUMENTS

| | | |
|---|---|---|
| CN | 104427006 A | 3/2015 |
| CN | 104796790 A | 7/2015 |
| CN | 105025544 A | 11/2015 |
| WO | 2015158285 A1 | 10/2015 |

OTHER PUBLICATIONS

Samsung, "IP address allocation," SA WG2 Meeting #118-BIS, Jan. 16-20, 2017, Spokane, WA, USA, S2-170565, 4 pages.

SA WG2 Meeting #119, S2-170859, "23.502: UE Traffic Routing," Motorola Mobility, Lenovo, Broadcom, Feb. 13-17, 2017, Dubrovnik, Croatia, 6 pages.

Machine Translation and Abstract of Chinese Publication No. CN104796790, Jul. 22, 2015, 7 pages.

Machine Translation and Abslract of Chinese Publication No. CN102958128, Mar. 6, 2013, 18 pages.

"3rd Generation Partnership Project; Technical Specification Group Services and System Aspects; System Architecture for the 5G System; Stage 2 (Release 15)," 3GPP TS 23.501 V0.3.1, Mar. 2017, 97 pages.

"3rd Generation Partnership Project; Technical Specification Group Services and System Aspects; Procedures for the 5G System; Stage 2 (Release 15)," 3GPP TS 23.502 V0.2.0, Feb. 2017, 71 pages.

Samsung, "IP address allocation," SA WG2 Meeting #118-BIS S2-170269, Jan. 16-20, 2017, Spokane, WA, USA, 4 pages.

"3rd Generation Partnership Project; Technical Specification Group Services and System Aspects; Study on Architecture for Next Generation System (Release 14)," 3GPP TR 23.799 V14.0.0, Part 1, Dec. 2016, 150 pages.

"3rd Generation Partnership Project; Technical Specification Group Services and System Aspects; Study on Architecture for Next Generation System (Release 14)," 3GPP TR 23.799 V14.0.0, Part 2, Dec. 2016, 150 pages.

"3rd Generation Partnership Project; Technical Specification Group Services and System Aspects; Study on Architecture for Next Generation System (Release 14)," 3GPP TR 23.799 V14.0.0, Part 3, Dec. 2016, 150 pages.

"3rd Generation Partnership Project; Technical Specification Group Services and System Aspects; Study on Architecture for Next Generation System (Release 14)," 3GPP TR 23.799 V14.0.0, Part 4, Dec. 2016, 72 pages.

Draves, R., et al, "Default Router Preferences and More-Specific Routes," RFC4191, Nov. 2005, 15 pages.

Nokia, et al., "23.501: Introducing SSC mode and UPF Selection," S2-170353, SA WG2 Meeting #118BIS; Jan. 16-20, 2017, Spokane, Washington, USA; Agenda Item: 6.5.3 (SMandSC), 4 pages.

Foreign Communication From a Counterpart Application, Chinese Application No. 201780027013.X, Chinese Office Action dated Dec. 2, 2019, 7 pages.

Foreign Communication From a Counterpart Application, European Application No. 17899417.4, Extended European Search Report dated Nov. 15, 2019, 9 pages.

Foreign Communication From a Counterpart Application, PCT Application No. PCT/CN2017/075991, English Translation of International Search Report dated Nov. 3, 2017, 2 pages.

Foreign Communication From a Counterpart Application, PCT Application No. PCT/CN2017/075991, English Translation of Written Opinion dated Nov. 3, 2017, 4 pages.

* cited by examiner

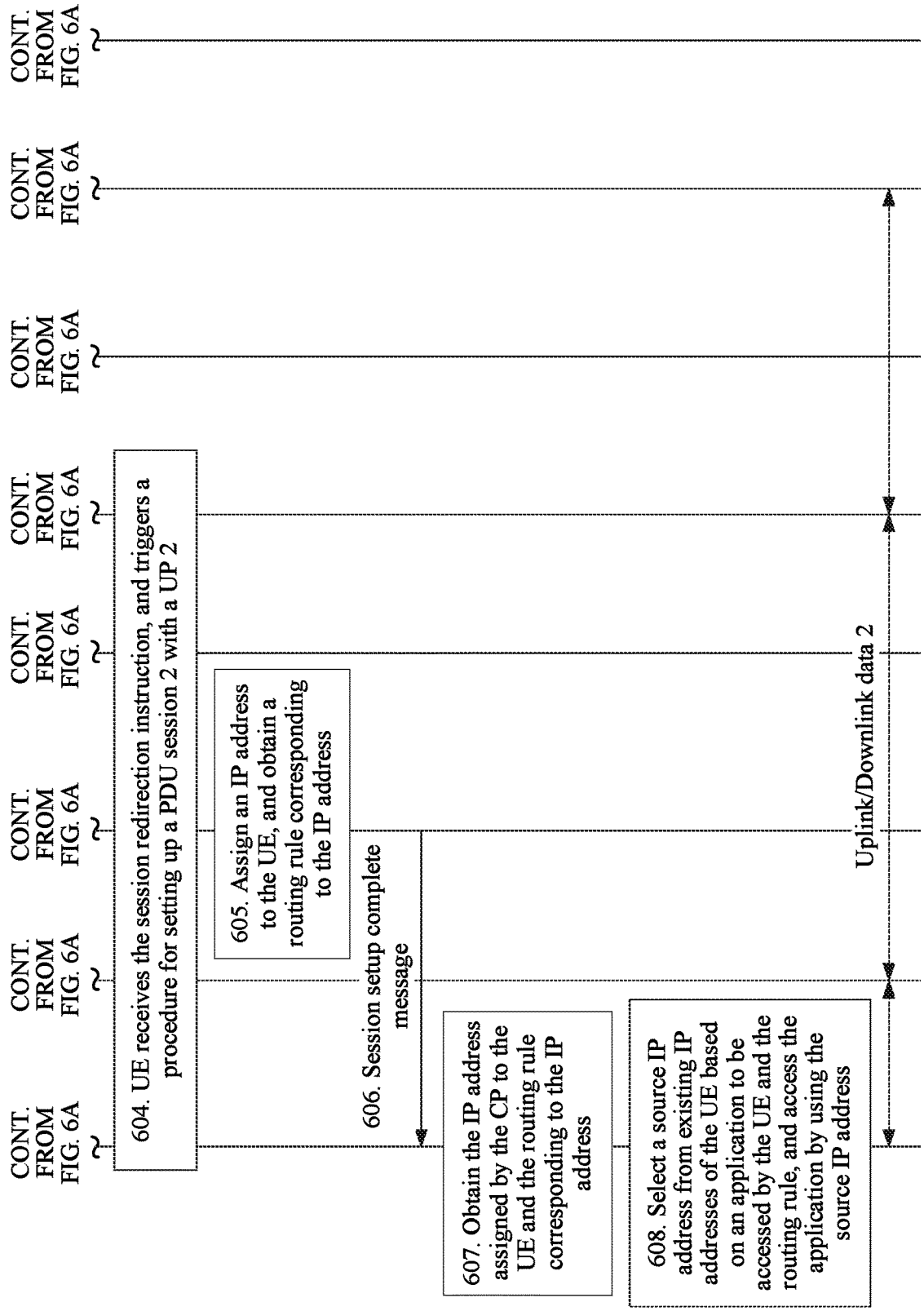

COMMUNICATION METHOD AND COMMUNICATIONS APPARATUS

CROSS-REFERENCE TO RELATED APPLICATIONS

This application is a continuation of International Patent Application No. PCT/CN2017/075991, filed on Mar. 8, 2017, the disclosure of which is hereby incorporated by reference in its entirety.

TECHNICAL FIELD

The present disclosure relates to the field of Internet communications, and in particular, to a communication method and a communications apparatus.

BACKGROUND

With continuous development of Internet technologies, the next generation Internet has higher requirements on quality of service of the network and session and service continuity (SSC). For a user equipment, in a process of setting up a packet data unit (PDU) session that passes through a user plane device, a control plane device assigns an Internet Protocol (IP) address to the user equipment, and the user equipment may use the IP address as a source IP address for performing service transmission through the user plane device.

Currently, after registering with the network, the user equipment may initiate a process of setting up a PDU session. In the setup process, the user equipment may determine a session and service continuity mode of the PDU session based on a SSC Mode Selection Policy (MSP), such that the user equipment can perform service transmission based on the session and service continuity mode. After the PDU session is set up, a location of the user equipment may change. To save network resources, a network side may trigger reselection of a user plane device, and set up a user plane path, such that the control plane device assigns a new IP address to the user equipment. However, when the network side triggers the reselection of the user plane device, and the control plane device reassigns an IP address or assigns an IP prefix to the user equipment, the network side may send a session and service continuity mode to the user equipment, such that the user equipment can select, from a plurality of IP addresses of the user equipment based on the session and service continuity mode sent by the network side, a source IP address for performing service transmission.

In a process of implementing the present disclosure, the inventor finds that other approaches have at least the following problem.

These approaches provide only a method for determining the session and service continuity mode when the user equipment initiates the process of setting up the PDU session, but does not resolve how a routing rule is generated. In addition, other approaches do not provide a related method for determining a session and service continuity mode when the network side triggers reselection of the user plane device and the control plane device reassigns the IP address or assigns the IP prefix to the user equipment. Consequently, the user equipment cannot select an appropriate source IP address for performing service transmission, and communication efficiency is low.

SUMMARY

To resolve the problem in other approaches, embodiments of the present disclosure provide a communication method and a communications apparatus. The technical solutions are as follows.

According to a first aspect, a communication method is provided, where the method includes: assigning, by a control plane device, an Internet Protocol (IP) address to a user equipment; obtaining, by the control plane device using a routing policy network element, a routing rule corresponding to the IP address; and sending, by the control plane device, the routing rule and the IP address to the user equipment, where the routing rule is used by the user equipment to determine a source IP address when the user equipment initiates a service.

The routing rule is IP address information of an application server. For example, the routing rule may be an IP address segment of an application server managed by the routing policy network element. The source IP address is an IP address used by the user equipment to access an application.

In the method provided by this embodiment of the present disclosure, the control plane device may obtain, using the routing policy network element, the routing rule corresponding to the IP address assigned by the control plane device to the user equipment. The control plane device sends, to the user equipment, the IP address assigned by the control plane device to the user equipment and the routing rule corresponding to the IP address, such that the user equipment can select, based on the application to be accessed and the routing rule, an appropriate source IP address to access the application, thereby improving communication efficiency.

In a first possible implementation of the first aspect, obtaining, by the control plane device using a routing policy network element, a routing rule corresponding to the IP address includes: obtaining, by the control plane device, at least one routing rule using the routing policy network element; and determining, by the control plane device based on the assigned IP address, the routing rule corresponding to the IP address.

In the method provided by this embodiment of the present disclosure, the control plane device obtains the at least one routing rule using the routing policy network element, and determines, from the at least one routing rule, the routing rule corresponding to the IP address assigned by the control plane device to the user equipment. The control plane device may send, to the user equipment, the IP address and the routing rule corresponding to the IP address, such that the UE can select, based on the application to be accessed and the routing rule, an appropriate source IP address to access the application, thereby improving communication efficiency.

In a second possible implementation of the first aspect, obtaining, by the control plane device, at least one routing rule using the routing policy network element includes: obtaining, by the control plane device, the at least one routing rule from the routing policy network element; or obtaining, by the control plane device, the at least one routing rule from a database, where the at least one routing rule is saved in the database by the routing policy network element.

In the method provided by this embodiment of the present disclosure, the control plane device may obtain the at least one routing rule from the routing policy network element, or may obtain the at least one routing rule from the database.

In this way, manners of obtaining the routing rule by the control plane device using the routing policy network element are enriched.

In a third possible implementation of the first aspect, the routing rule includes an IP address segment of an application server managed by the routing policy network element.

In the method provided by this embodiment of the present disclosure, the routing rule sent by the control plane device to the user equipment may include the IP address segment of the application server managed by the routing policy network element, such that the user equipment can select, based on the routing rule, an appropriate source IP address to access the application, thereby improving communication efficiency.

In a fourth possible implementation of the first aspect, before assigning, by a control plane device, an IP address to user equipment, the method further includes: obtaining, by the control plane device, a session and service continuity requirement of an application using the routing policy network element. Assigning, by a control plane device, an IP address to user equipment includes: assigning, by the control plane device, the IP address to the user equipment based on the session and service continuity requirement of the application.

The session and service continuity requirement is a requirement of the application on maintaining session and service continuity. For example, the application expects that uninterrupted transmission of a service accessing the application can be maintained even if a location of the user equipment changes in a process of accessing the application. In this way, IP continuity is provided.

In the method provided by this embodiment of the present disclosure, the control plane device may determine a session and service continuity mode of a PDU session based on the session and service continuity requirement of the application that is obtained from the routing policy network element, and assign the IP address to the user equipment. In this way, a method for assigning the IP address is provided, and communication efficiency is improved.

In a fifth possible implementation of the first aspect, the method further includes: sending, by the control plane device to the user equipment, a session and service continuity mode corresponding to the IP address.

The session and service continuity mode is a mode used by the application to satisfy the session and service continuity requirement. For example, in a session and service continuity mode (for example, in a session and service continuity mode 1), even if the location of the user equipment changes in the process of accessing the application, a same user plane device is still used to forward packets sent by the user equipment. In another session and service continuity mode (for example, in a session and service continuity mode 2), if the user equipment moves beyond a service area of a user plane device in the process of accessing the application, a session is released, the control plane device selects a user plane device based on a new location of the user equipment, the user equipment sets up a new session using the newly selected user plane device, and packets sent by the user equipment are forwarded by the newly selected user plane device. In another session and service continuity mode (for example, in a session and service continuity mode 3), if the location of the user equipment changes in the process of accessing the application, the control plane device selects a user plane device based on a new location of the user equipment, the user equipment sets up a new session using the newly selected user plane device, and packets of the user equipment are simultaneously forwarded using two sessions, that is, the old user plane device and the newly selected user plane device. A service in the old session is released after being migrated to the new session, or the old session is released after a preset time expires.

In the method provided by this embodiment of the present disclosure, when sending the IP address and the routing rule to the user equipment, the control plane device may send, to the user equipment, the session and service continuity mode corresponding to the IP address, such that the user equipment can select, based on the routing rule and the session and service continuity mode corresponding to the IP address, an appropriate source IP address to access the application, thereby improving communication efficiency.

In a sixth possible implementation of the first aspect, the routing rule includes an IP address segment of an application server corresponding to applications having a same session and service continuity requirement.

In the method provided by this embodiment of the present disclosure, the routing rule sent by the control plane device to the user equipment may include the IP address segment of the application server corresponding to the applications having the same session and service continuity requirement, such that the user equipment can select, based on the routing rule, an appropriate source IP address to access the application, thereby improving communication efficiency.

In a seventh possible implementation of the first aspect, sending, by the control plane device, the routing rule and the IP address to the user equipment includes: sending, by the control plane device, a session setup complete message to the user equipment, where the session setup complete message carries the routing rule and the IP address; or sending, by the control plane device, a router advertisement RA message to the user equipment using a user plane device, where the RA message carries the routing rule and the IP address.

In the method provided by this embodiment of the present disclosure, in different implementation scenarios, the control plane device may send the routing rule and the IP address to the user equipment directly or using the user plane device, such that the user equipment can select, based on the routing rule, an appropriate source IP address to access the application.

According to a second aspect, a communication method is provided, where the method includes: obtaining, by a routing policy network element, a routing rule; and providing, by the routing policy network element, the routing rule for a control plane device.

In the method provided by this embodiment of the present disclosure, the routing policy network element may obtain the routing rule and provide the routing rule for the control plane device; and the control plane device may send the routing rule to user equipment, such that the user equipment can select, based on the routing rule, an appropriate source IP address to access an application, thereby improving communication efficiency.

In a first possible implementation of the second aspect, providing, by the routing policy network element, the routing rule for a control plane device includes: saving, by the routing policy network element, the routing rule in a database, such that the control plane device obtains the routing rule from the database; or sending, by the routing policy network element, the routing rule to the control plane device.

In the method provided by this embodiment of the present disclosure, the routing policy network element may provide the routing rule for the control plane device directly or by saving the routing rule in the database, such that the control plane device can obtain the routing rule from the database or can directly receive the routing rule from the routing policy network element. In this way, a plurality of manners of obtaining the routing rule by the control plane device are provided.

In a second possible implementation of the second aspect, the method further includes: obtaining, by the routing policy network element, a session and service continuity requirement of an application; and sending, by the routing policy network element, the session and service continuity requirement of the application to the control plane device.

In the method provided by this embodiment of the present disclosure, the routing policy network element may obtain the session and service continuity requirement of the application and send the session and service continuity requirement of the application to the control plane device, such that the control plane device can determine a session and service continuity mode of the PDU session based on the session and service continuity requirement of the application and assign an IP address to the user equipment. In this way, a method for assigning the IP address is provided, and communication efficiency is improved.

In a third possible implementation of the second aspect, before providing, by the routing policy network element, the routing rule for a control plane device, the method further includes: obtaining, by the routing policy network element based on the session and service continuity requirement of the application, an IP address segment of an application server corresponding to applications having a same session and service continuity requirement.

In the method provided by this embodiment of the present disclosure, the routing policy network element may perform address segment classification based on the session and service continuity requirement of the application, to obtain the IP address segment of the application server corresponding to the applications having the same session and service continuity requirement. The routing policy network element may provide, for the control plane device, the IP address segment of the application server corresponding to the applications having the same session and service continuity requirement, such that the routing rule sent by the control plane device to the user equipment can include the IP address segment of the application server corresponding to the applications having the same session and service continuity requirement. The user equipment can select, based on the routing rule, an appropriate source IP address to access the application, thereby improving communication efficiency.

In a fourth possible implementation of the second aspect, the routing rule includes an IP address segment of an application server managed by the routing policy network element, or the routing rule includes the IP address segment of the application server corresponding to the applications having the same session and service continuity requirement.

In the method provided by this embodiment of the present disclosure, the routing rule provided by the routing policy network element for the control plane device may include the IP address segment of the application server managed by the routing policy network element, or may include the IP address segment of the application server corresponding to the applications having the same session and service continuity requirement. In this way, forms of routing rules are enriched.

According to a third aspect, a communication method is provided, where the method includes: obtaining, by user equipment, an IP address of the user equipment, a routing rule, and a session and service continuity mode corresponding to the IP address; and selecting, by the user equipment, a source IP address from existing IP addresses of the user equipment based on an application to be accessed by the user equipment, the routing rule, and the session and service continuity mode corresponding to the IP address, and accessing the application using the source IP address.

In the method provided by this embodiment of the present disclosure, the user equipment may obtain the IP address, the routing rule, and the session and service continuity mode corresponding to the IP address, such that the user equipment can select, based on the application to be accessed, the routing rule, and the session and service continuity mode corresponding to the IP address, an appropriate source IP address to access the application, thereby improving communication efficiency.

In a first possible implementation of the third aspect, the routing rule includes an IP address segment of an application server managed by a routing policy network element.

In the method provided by this embodiment of the present disclosure, the routing rule obtained by the user equipment may include the IP address segment of the application server managed by the routing policy network element, such that the user equipment can select, based on the application to be accessed, the routing rule, and the session and service continuity mode corresponding to the IP address, an appropriate source IP address to access the application, thereby improving communication efficiency.

In a second possible implementation of the third aspect, obtaining, by user equipment, an IP address of the user equipment, a routing rule, and a session and service continuity mode corresponding to the IP address includes: obtaining, by the user equipment from a control plane device, the IP address of the user equipment, the routing rule, and the session and service continuity mode corresponding to the IP address; and selecting, by the user equipment, a source IP address from existing IP addresses of the user equipment based on an application to be accessed by the user equipment, the routing rule, and the session and service continuity mode corresponding to the IP address includes: selecting, by the user equipment, the source IP address from the existing IP addresses of the user equipment based on a session and service continuity requirement of the application to be accessed by the user equipment, the routing rule, and the session and service continuity mode corresponding to the IP address.

In the method provided by this embodiment of the present disclosure, the user equipment may obtain, from the control plane device, the IP address, the routing rule, and the session and service continuity mode corresponding to the IP address, and select, based on the session and service continuity requirement of the application to be accessed, the routing rule, and the session and service continuity mode corresponding to the IP address, an appropriate source IP address to access the application, thereby improving communication efficiency.

In a third possible implementation of the third aspect, selecting, by the user equipment, the source IP address from the existing IP addresses of the user equipment based on a session and service continuity requirement of the application to be accessed by the user equipment, the routing rule, and the session and service continuity mode corresponding to the IP address includes: selecting, by the user equipment, the source IP address according to a preset rule, where the preset rule includes that a session and service continuity mode corresponding to the source IP address satisfies the session and service continuity requirement of the application to be accessed by the user equipment, and that an IP address of an application server corresponding to the application to be accessed by the user equipment is in the IP address segment included in the routing rule.

In the method provided by this embodiment of the present disclosure, the user equipment may select, on a basis that the session and service continuity mode corresponding to the IP address satisfies the session and service continuity requirement of the application to be accessed by the user equipment and that the IP address of the application server corresponding to the application to be accessed by the user equipment is in the IP address segment included in the routing rule, an appropriate source IP address to access the application, thereby improving communication efficiency.

In a fourth possible implementation of the third aspect, obtaining, by user equipment, an IP address of the user equipment, a routing rule, and a session and service continuity mode corresponding to the IP address includes: receiving, by the user equipment, a session setup complete message from the control plane device, where the session setup complete message carries the IP address, the routing rule, and the session and service continuity mode corresponding to the IP address; or receiving, by the user equipment, a router advertisement RA message from a user plane device, where the RA message carries the IP address, the routing rule, and the session and service continuity mode corresponding to the IP address.

In the method provided by this embodiment of the present disclosure, in different implementation scenarios, the user equipment may obtain, using the session setup complete message sent by the control plane device or using the RA message sent by the user plane device, the routing rule and the session and service continuity mode corresponding to the IP address, such that the user equipment can select, based on the routing rule and the session and service continuity mode corresponding to the IP address, an appropriate source IP address to access the application.

According to a fourth aspect, a communications apparatus is provided, where the apparatus includes a plurality of function modules, and the plurality of function modules are configured to perform the communication method provided by the first aspect and any possible implementation of the first aspect.

According to a fifth aspect, a communications apparatus is provided, where the apparatus includes a plurality of function modules, and the plurality of function modules are configured to perform the communication method provided by the second aspect and any possible implementation of the second aspect.

According to a sixth aspect, a communications apparatus is provided, where the apparatus includes a plurality of function modules, and the plurality of function modules are configured to perform the communication method provided by the third aspect and any possible implementation of the third aspect.

According to a seventh aspect, a control plane device is provided, where the control plane device includes a processor and a memory configured to store an instruction executable by the processor, where the executable instruction is used to perform the following operations: assigning an IP address to user equipment; obtaining, using a routing policy network element, a routing rule corresponding to the IP address; and sending the routing rule and the IP address to the user equipment, where the routing rule is used by the user equipment to determine a source IP address when the user equipment initiates a service.

In a possible implementation, the executable instruction is used to perform the following operations: obtaining at least one routing rule using the routing policy network element; and determining, based on the assigned IP address, the routing rule corresponding to the IP address.

In a possible implementation, the executable instruction is used to perform the following operations: obtaining the at least one routing rule from the routing policy network element; or obtaining the at least one routing rule from a database, where the at least one routing rule is saved in the database by the routing policy network element.

In a possible implementation, the routing rule includes an IP address segment of an application server managed by the routing policy network element.

In a possible implementation, the executable instruction is used to perform the following operations: obtaining a session and service continuity requirement of an application using the routing policy network element; and assigning the IP address to the user equipment based on the session and service continuity requirement of the application.

In a possible implementation, the executable instruction is used to perform the following operations: sending, to the user equipment, a session and service continuity mode corresponding to the IP address.

In a possible implementation, the routing rule includes an IP address segment of an application server corresponding to applications having a same session and service continuity requirement.

In a possible implementation, the executable instruction is used to perform the following operations: sending a session setup complete message to the user equipment, where the session setup complete message carries the routing rule and the IP address; or sending a router advertisement RA message to the user equipment using a user plane device, where the RA message carries the routing rule and the IP address.

According to an eighth aspect, a routing policy network element is provided, where the routing policy network element includes a processor and a memory configured to store an instruction executable by the processor, where the executable instruction is used to perform the following operations: obtaining a routing rule; and providing the routing rule for a control plane device.

In a possible implementation, the executable instruction is used to perform the following operations: saving the routing rule in a database, such that the control plane device obtains the routing rule from the database; or sending the routing rule to the control plane device.

In a possible implementation, the executable instruction is used to perform the following operations: obtaining a session and service continuity requirement of an application; and sending the session and service continuity requirement of the application to the control plane device.

In a possible implementation, the executable instruction is used to perform the following operations: obtaining, based on the session and service continuity requirement of the application, an IP address segment of an application server corresponding to applications having a same session and service continuity requirement.

In a possible implementation, the routing rule includes an IP address segment of an application server managed by the routing policy network element, or the routing rule includes the IP address segment of the application server corresponding to the applications having the same session and service continuity requirement.

According to a ninth aspect, user equipment is provided, where the user equipment includes a processor and a memory configured to store an instruction executable by the processor, where the executable instruction is used to perform the following operations: obtaining an IP address of the user equipment, a routing rule, and a session and service continuity mode corresponding to the IP address; and selecting a source IP address from existing IP addresses of the user equipment based on an application to be accessed by the user equipment, the routing rule, and the session and service continuity mode corresponding to the IP address, and accessing the application using the source IP address.

In a possible implementation, the routing rule includes an IP address segment of an application server managed by a routing policy network element.

In a possible implementation, the executable instruction is used to perform the following operations: obtaining, from a control plane device, the IP address of the user equipment, the routing rule, and the session and service continuity mode corresponding to the IP address; and selecting the source IP address from the existing IP addresses of the user equipment based on a session and service continuity requirement of the application to be accessed by the user equipment, the routing rule, and the session and service continuity mode corresponding to the IP address.

In a possible implementation, the executable instruction is used to perform the following operations: selecting the source IP address according to a preset rule, where the preset rule includes that a session and service continuity mode corresponding to the source IP address satisfies the session and service continuity requirement of the application to be accessed by the user equipment, and that an IP address of an application server corresponding to the application to be accessed is in the IP address segment included in the routing rule.

In a possible implementation, the executable instruction is used to perform the following operations: receiving a session setup complete message from the control plane device, where the session setup complete message carries the IP address, the routing rule, and the session and service continuity mode corresponding to the IP address; or receiving a router advertisement RA message from a user plane device, where the RA message carries the IP address, the routing rule, and the session and service continuity mode corresponding to the IP address.

BRIEF DESCRIPTION OF DRAWINGS

FIG. 6A and FIG. 6B are flowcharts of a communication method according to an embodiment of the present disclosure;

DESCRIPTION OF EMBODIMENTS

To make the objectives, technical solutions, and advantages of the present disclosure clearer, the following further describes the implementations of the present disclosure in detail with reference to the accompanying drawings.

All the foregoing optional technical solutions may be randomly combined to form optional embodiments of the present disclosure. Details are not described herein.

Figure 1:
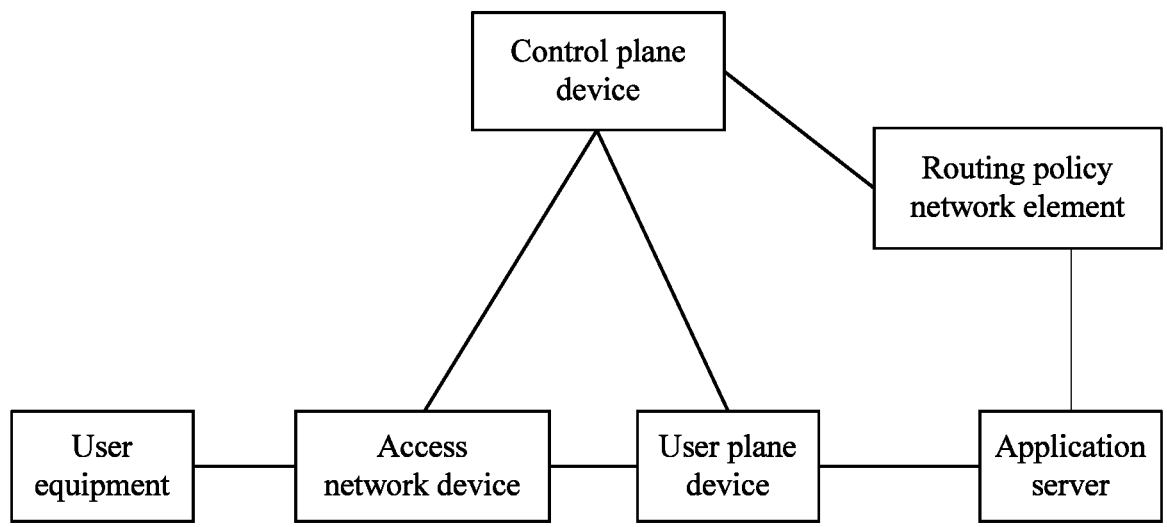
FIG. 1 is a schematic structural diagram of a system according to an embodiment of the present disclosure.

FIG. 1 is a schematic structural diagram of a system according to an embodiment of the present disclosure. Referring to FIG. 1, a structure of the system includes a user equipment (UE), an access network device (AN), a control plane device (CP), a user plane device (UP), a routing policy network element, and an application server (AS).

The UE may include various handheld devices, in-vehicle devices, wearable devices, or computing devices that have a wireless communication function, or other processing devices connected to a wireless modem. The UE may also be referred to as a terminal device, a mobile station (MS), or a terminal, or may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communications (MTC) terminal, or the like.

The AN is an apparatus deployed in a radio access network and configured to provide a wireless communication function for the UE. The AN may include various base stations such as a macro base station, a micro base station (also referred to as a small cell), a relay station, and an access point. A device with a base station function may have different names in systems that use different radio access technologies. For example, in an LTE system, the device is referred to as an evolved NodeB (eNB or eNodeB), and in a 3rd Generation (3G) system, the device is referred to as a NodeB.

The CP may be responsible for UE attachment, mobility management, a tracking area update procedure, UE session management, UP selection, UP reselection, Internet Protocol (IP) address assignment, quality of service (QoS) control, resource setup, modification, and release, and the like. The CP may be a session management function (SMF), a policy control function (PCF), or another control plane network element.

The UP may be responsible for processing functions such as packet forwarding and statistics for the terminal device.

For example, the UP may implement a user plane function of a serving gateway (SGW) and a packet data network gateway (PGW).

The routing policy network element may be a network element that manages a routing rule, for example, a network management system, an authentication, authorization and accounting (AAA) server, or an application server (AS) controller.

The AS is an application server providing a service, for example, an application server providing a voice service.

Figure 2:
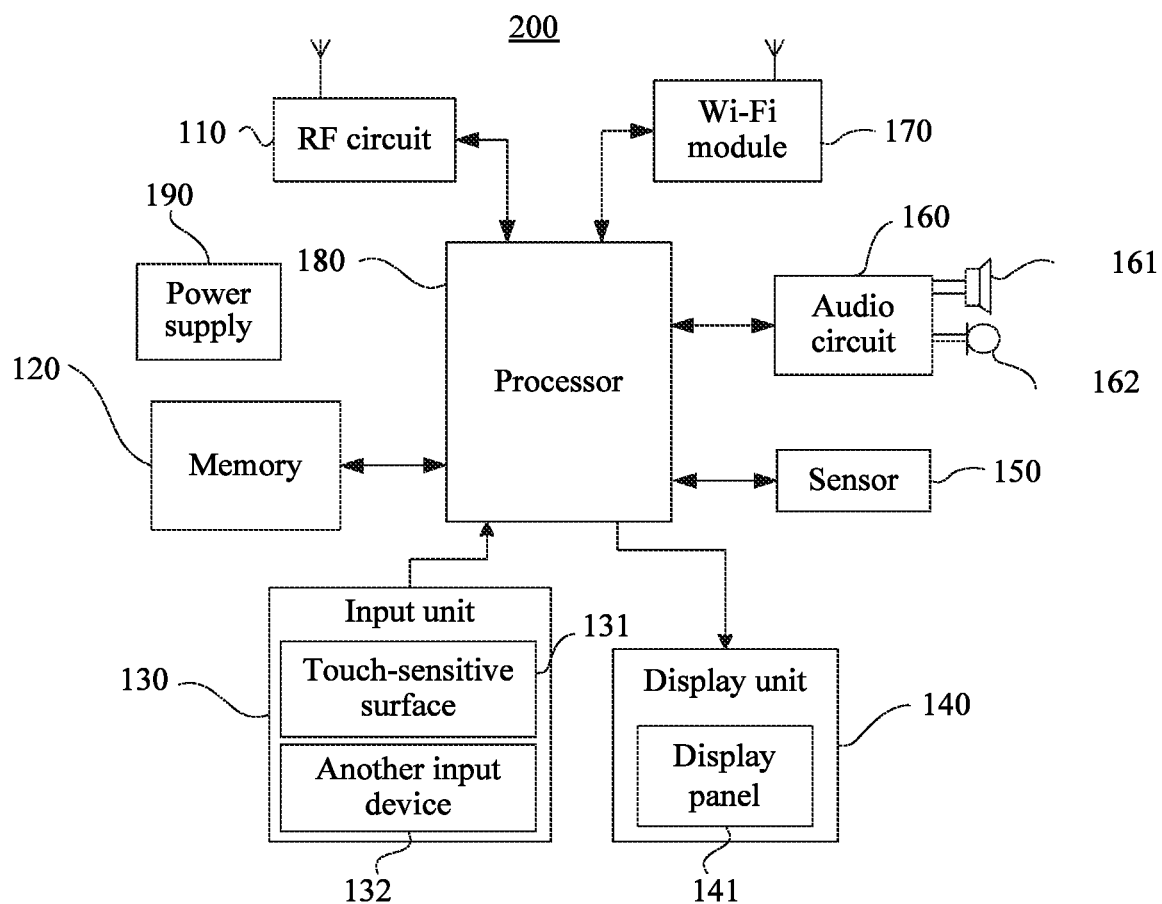
FIG. 2 is a schematic structural diagram of user equipment 200 according to an embodiment of the present disclosure.

FIG. 2 is a schematic structural diagram of user equipment 200 according to an embodiment of the present disclosure. The user equipment may be configured to perform a communication method provided in each of the following embodiments. Referring to FIG. 2, the user equipment 200 may include components such as a radio frequency (RF) circuit 110, a memory 120 including one or more computer-readable storage media, an input unit 130, a display unit 140, a sensor 150, an audio circuit 160, a Wi-Fi module 170, a processor 180 including one or more processing cores, and a power supply 190. A person skilled in the art may understand that the user equipment is not limited to a user equipment structure shown in FIG. 2, and the user equipment may include more or fewer parts than those shown in the figure, or some parts may be combined, or an arrangement of parts may be different.

The RF circuit 110 may be configured to send and receive signals during an information sending and receiving process or a call process. Particularly, the RF circuit 110 receives downlink information from a base station, then delivers the downlink information to the one or more processors 180 for processing, and sends related uplink data to the base station. Usually, the RF circuit 110 includes but is not limited to an antenna, at least one amplifier, a tuner, one or more oscillators, a subscriber identity module (SIM) card, a transceiver, a coupler, a low noise amplifier (LNA), a duplexer, or the like. In addition, the RF circuit 110 may also communicate with a network and another device through wireless communication. The wireless communication may use any communication standard or protocol, including but not limited to the global system for mobile communications (GSM), general packet radio service (GPRS), code division multiple access (CDMA), wideband code division multiple access (WCDMA), long term evolution (LTE), email, short messaging service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program that is required by at least one function (such as a sound playing function or an image display function), and the like. The data storage area may store data (such as audio data or a phone book) created according to use of the user equipment 200, and the like. In addition, the memory 120 may include a high-speed random access memory, and may further include a non-volatile memory, such as at least one magnetic disk storage device, a flash memory, or another non-volatile solid-state storage device. Correspondingly, the memory 120 may further include a memory controller to provide access to the memory 120 for the processor 180 and the input unit 130.

The input unit 130 may be configured to receive input digit or character information, and generate signal input of a keyboard, a mouse, a joystick, light pen, or a track ball, where the signal input is related to a user setting and function control. For example, the input unit 130 may include a touch-sensitive surface 131 and another input device 132. The touch-sensitive surface 131, also referred to as a touch display screen or a touch panel, may collect a touch operation of a user on or near the touch-sensitive surface (such as an operation of the user on or near the touch-sensitive surface 131 using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch direction of the user, detects a signal brought by a touch operation, and transmits the signal to the touch controller. The touch controller receives touch information from the touch detection apparatus, converts the touch information into point coordinates, and sends the point coordinates to the processor 180, and can receive a command sent by the processor 180 and execute the command. In addition, the touch-sensitive surface 131 may be implemented using a plurality of types such as resistive, capacitive, infrared, and surface acoustic wave. The input unit 130 may further include the other input device 132 in addition to the touch-sensitive surface 131. For example, the other input device 132 may include but is not limited to one or more of a physical keyboard, a function key (such as a volume control key or a power on/off key), a trackball, a mouse, a joystick, and the like.

The display unit 140 may be configured to display information input by the user or information provided to the user, and various graphical user interfaces of the user equipment 200. The graphical user interfaces may be constituted by an image, text, an icon, a video, and any combination thereof. The display unit 140 may include a display panel 141. Optionally, the display panel 141 may be configured in a form of a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180 to determine a touch event type. Subsequently, the processor 180 provides corresponding visual output on the display panel 141 based on the touch event type. Although, in FIG. 2, the touch-sensitive surface 131 and the display panel 141 are used as two separate components to implement input and output functions, in some embodiments, the touch-sensitive surface 131 and the display panel 141 may be integrated to implement the input and output functions.

The user equipment 200 may further include at least one sensor 150, such as a light sensor, a motion sensor, and another sensor. For example, the light sensor may include an ambient light sensor and a proximity sensor. The ambient light sensor may adjust luminance of the display panel 141 based on brightness of ambient light. The proximity sensor may turn off the display panel 141 and/or backlight when the user equipment 200 is moved to an ear. As one type of motion sensor, an accelerometer sensor may detect acceleration magnitude in various directions (usually on three axes), may detect magnitude and a direction of gravity when being stationary, and may be applied to an application that recognizes a posture of the mobile phone (for example, switching between landscape orientation and portrait orientation, a related game, and magnetometer posture calibration), a function related to vibration recognition (such as a pedometer and a stroke), and the like. Other sensors such as a gyroscope, a barometer, a hygrometer, a thermometer, and an infrared sensor may also be configured in the user equipment 200, and details are not described herein.

The audio circuit 160, a speaker 161, and a microphone 162 can provide an audio interface between the user and the user equipment 200. The audio circuit 160 may convert received audio data into an electrical signal and transmit the electrical signal to the speaker 161. The speaker 161 converts the electrical signal into a sound signal for output. On the other hand, the microphone 162 converts a collected sound signal into an electrical signal. The audio circuit 160 receives the electrical signal and converts the electrical signal into audio data, and outputs the audio data to the processor 180 for processing. Then the processor 180 sends the audio data to, for example, another user equipment using the RF circuit 110, or outputs the audio data to the memory 120 for further processing. The audio circuit 160 may further include an earphone jack to provide communication between a peripheral earphone and the user equipment 200.

Wi-Fi is a short-distance wireless transmission technology. The user equipment 200 may help, using the Wi-Fi module 170, the user send and receive emails, browse a web page, access streaming media, and the like, to provide wireless broadband Internet access for the user. Although FIG. 2 shows the Wi-Fi module 170, it may be understood that the Wi-Fi module 170 is not a mandatory part of the user equipment 200, and may be omitted according to a requirement without changing the essence of the present disclosure.

The processor 180 is a control center of the user equipment 200, is connected to all parts of the entire mobile phone using various interfaces and lines, and performs various functions of the user equipment 200 and process data by running or executing the software program and/or module stored in the memory 120 and by invoking data stored in the memory 120, to perform overall monitoring on the mobile phone. Optionally, the processor 180 may include one or more processing cores. Optionally, the processor 180 may integrate an application processor and a modem processor. The application processor mainly processes the operating system, a user interface, an application program, and the like. The modem processor mainly processes wireless communication. It may be understood that the modem processor may alternatively not be integrated into the processor 180.

The user equipment 200 further includes the power supply 190 (such as a battery) for supplying power to the components. Optionally, the power supply may be logically connected to the processor 180 using a power management system, thereby implementing functions such as charging, discharging, and power consumption management using the power management system. The power supply 190 may further include one or more of a direct current or alternating current power supply, a recharging system, a power failure detection circuit, a power converter or inverter, a power status indicator, and any other components.

Although not shown in the figure, the user equipment 200 may further include a camera, a Bluetooth module, and the like, and details are not described herein. For example, in this embodiment, the display unit of the user equipment is a touchscreen display, and the user equipment further includes a memory and an executable instruction. The executable instruction is stored in the memory and configured to be executed by the one or more processors. The executable instruction is used to perform a method on a user equipment side in the following embodiments shown in FIG. 5 to FIG. 10A and FIG. 10B.

Figure 3:
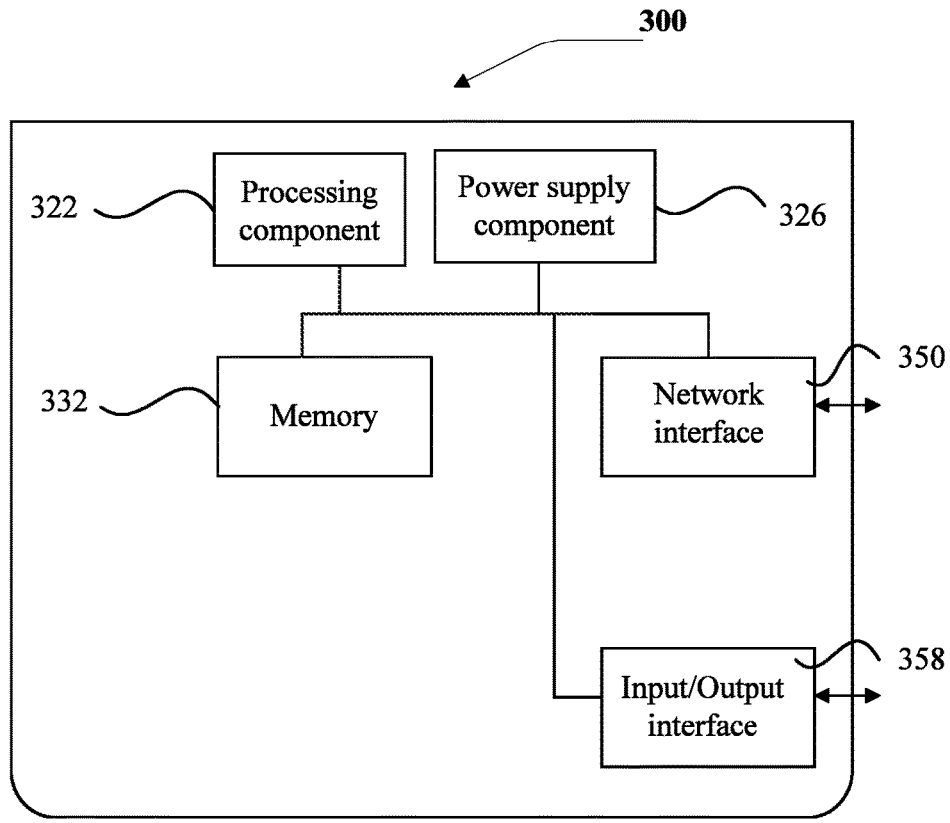
FIG. 3 is a schematic structural diagram of a routing policy network element 300 according to an embodiment of the present disclosure.

FIG. 3 is a schematic structural diagram of a routing policy network element 300 according to an embodiment of the present disclosure. Referring to FIG. 3, the routing policy network element 300 includes a processing component 322, and further includes one or more processors, and storage resources that are represented by a memory 332 and configured to store an instruction, for example, an application program, executable by the processing component 322. The application program stored in the memory 332 may include one or more modules each of which corresponds to a set of instructions. In addition, the processing component 322 is configured to execute an instruction to perform a method on a routing policy network element side in the following embodiments shown in FIG. 5 to FIG. 10A and FIG. 10B.

The routing policy network element 300 may further include a power supply component 326 configured to perform power management of the routing policy network element 300, a wired or wireless network interface 350 configured to connect the routing policy network element 300 to a network, and an input/output (I/O) interface 358. The routing policy network element 300 may operate an operating system stored in the memory 332, for example, Windows Server™, Mac OS X™, Unix™, Linux™, or FreeBSD™.

Figure 4:
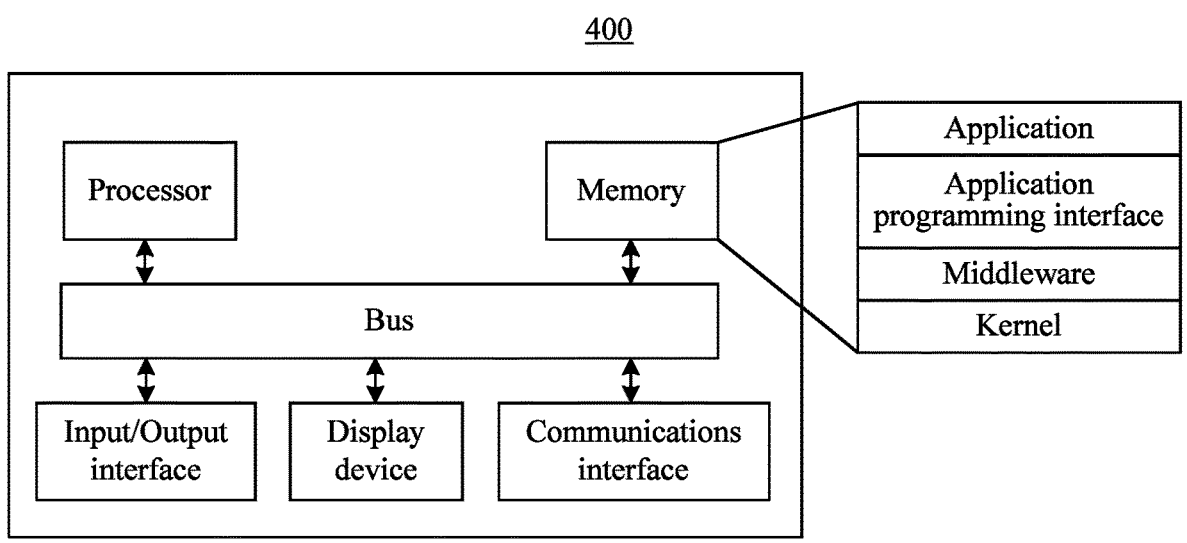
FIG. 4 is a schematic structural diagram of a control plane device 400 according to an embodiment of the present disclosure.

FIG. 4 is a schematic structural diagram of a control plane device 400 according to an embodiment of the present disclosure. Referring to FIG. 4, the control plane device 400 includes a bus, a processor, a memory, an input/output interface, a display device, and a communications interface. The memory stores an executable instruction, where the executable instruction is used to perform a method on a control plane device side in the following embodiments shown in FIG. 5 to FIG. 10A and FIG. 10B.

The bus is a circuit connecting the described elements and implements transmission between these elements. For example, the processor receives a command from another element using the bus, decrypts the received command, and performs calculation or processes data based on the decrypted command. The memory may include a program module, for example, a kernel, middleware, an application programming interface (API), and an application. The program module may include software, firmware, hardware, or at least two of the software, the firmware, and the hardware. The input/output interface forwards a command or data input by an input/output device (for example, a sensor, a keyboard, or a touchscreen). The display device displays various types of information to a user. The communications interface connects the control plane device 400 to another network device, user equipment, and a network. For example, the communications interface may connect to the network in a wired or wireless manner to connect to another external network device or user equipment. Wireless communication may include at least one of the following: wireless fidelity (Wi-Fi), bluetooth (BT), a near field communications technology (NFC), a global positioning system (GPS), cellular communication (for example, LTE, LTE-A, CDMA, WCDMA, UMTS, WiBro, and GSM. Wired communication may include at least one of the following: a universal serial bus (USB), a high definition multimedia interface (HDMI), an asynchronous communications standard interface (Recommended Standard (RS) 232 (RS-232)), and a plain old telephone service (POTS). The network may be a telecommunications network and a communications network. The communications network may be a computer network, the Internet, the Internet of Things, or a telephone network. The control plane device 400 may connect to the network using the communications interface. A protocol used for communication between the control plane device 400 and another network device may be supported by at least one of the application, the application programming interface (API), the middleware, the kernel, and the communications interface.

An example embodiment further provides a non-transitory computer-readable storage medium including an instruction, for example, a memory including an instruction, where the instruction may be executed by the processor in the control plane device to implement a communication method on a control plane device side in the following embodiment. For example, the non-transitory computer-readable storage medium may be a read-only memory (ROM), a random access memory (RAM), a compact disc read-only memory (CD-ROM), a magnetic tape, a floppy disk, or an optical data storage device.

Figure 5:
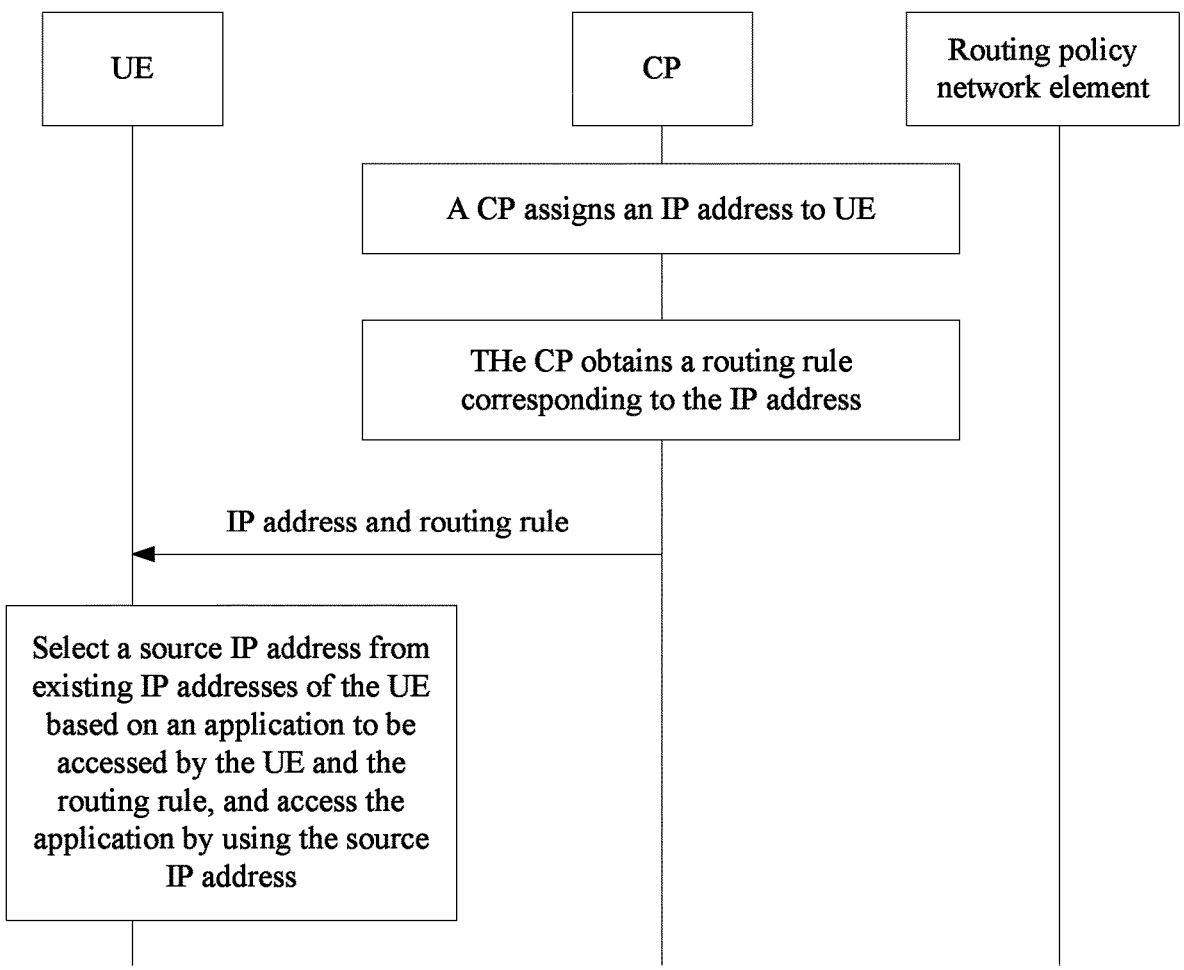
FIG. 5 is a flowchart of a communication method according to an embodiment of the present disclosure.

This present disclosure provides a communication method. Referring to FIG. 5, based on interaction among a CP, UE, and a routing policy network element, the communication method in this embodiment of the present disclosure may be described briefly as follows. The CP assigns an IP address to the UE. The CP obtains a routing rule corresponding to the IP address; the CP sends, to the UE, the IP address assigned by the CP to the UE and the routing rule. After obtaining the IP address assigned by the CP to the UE and the routing rule, the UE selects a source IP address from existing IP addresses of the UE based on an application to be accessed by the UE and the routing rule, and accesses the application using the source IP address.

In one case, the routing rule may be an IP address segment of an AS managed by the routing policy network element.

Figure 7:
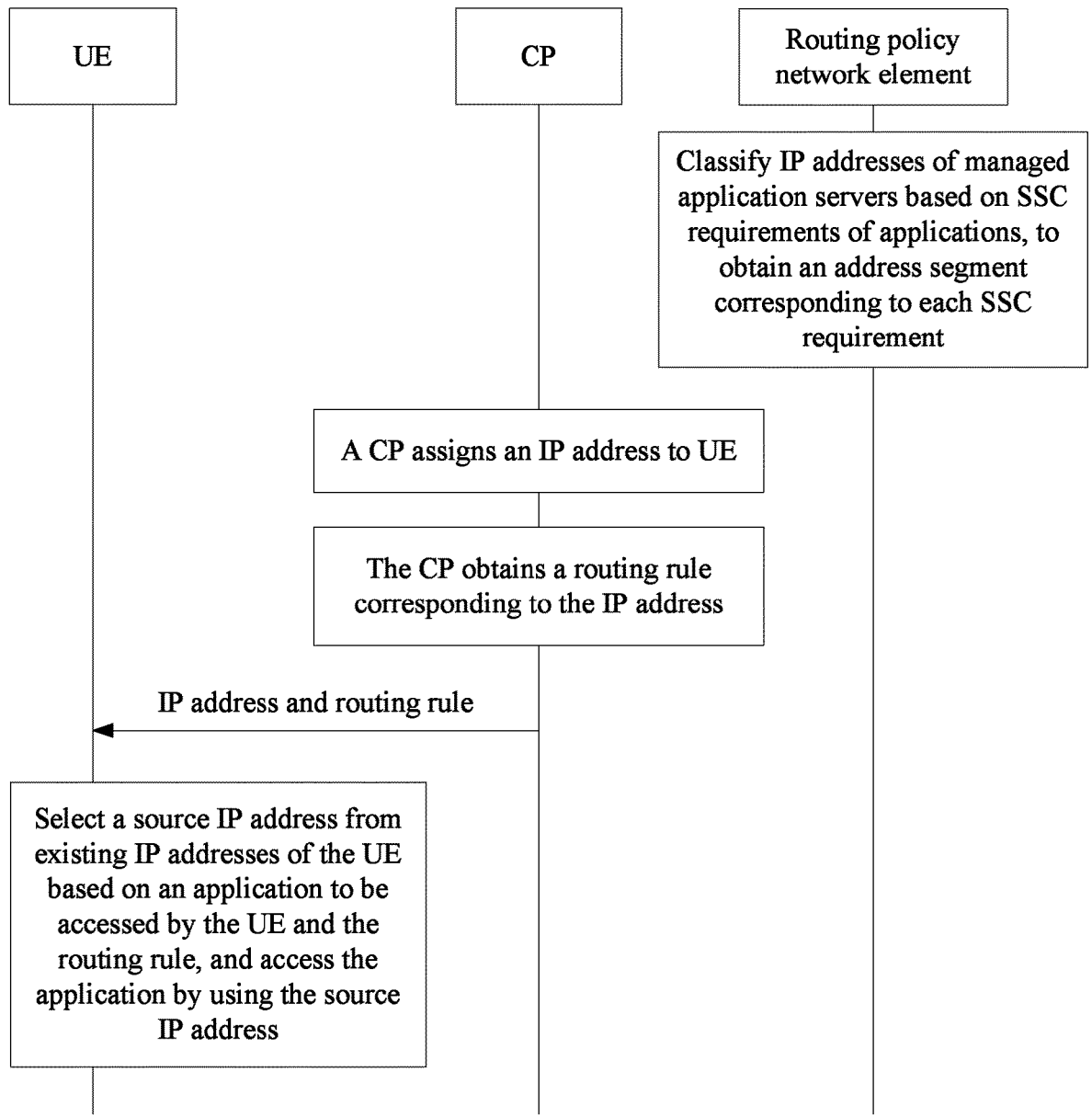
FIG. 7 is a flowchart of a communication method according to an embodiment of the present disclosure.

In another case, the routing rule may be an IP address segment of an AS that is classified by the routing policy network element based on an SSC requirement. In this case, the routing policy network element may classify, based on SSC requirements of applications, IP addresses of application servers managed by the routing policy network element, to obtain an address segment corresponding to each SSC requirement, as shown in FIG. 7.

Figure 6A:
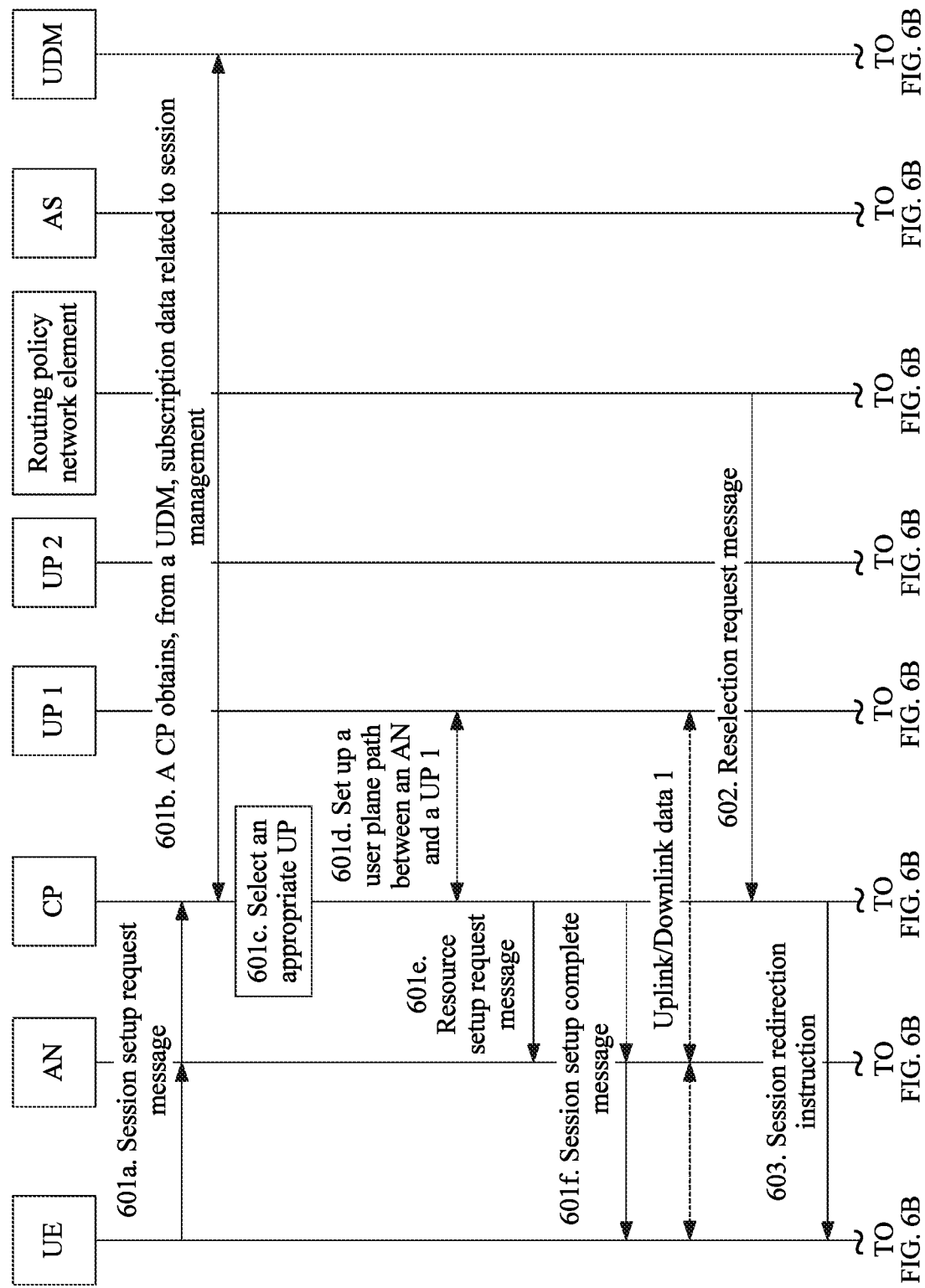
Figure 8A:
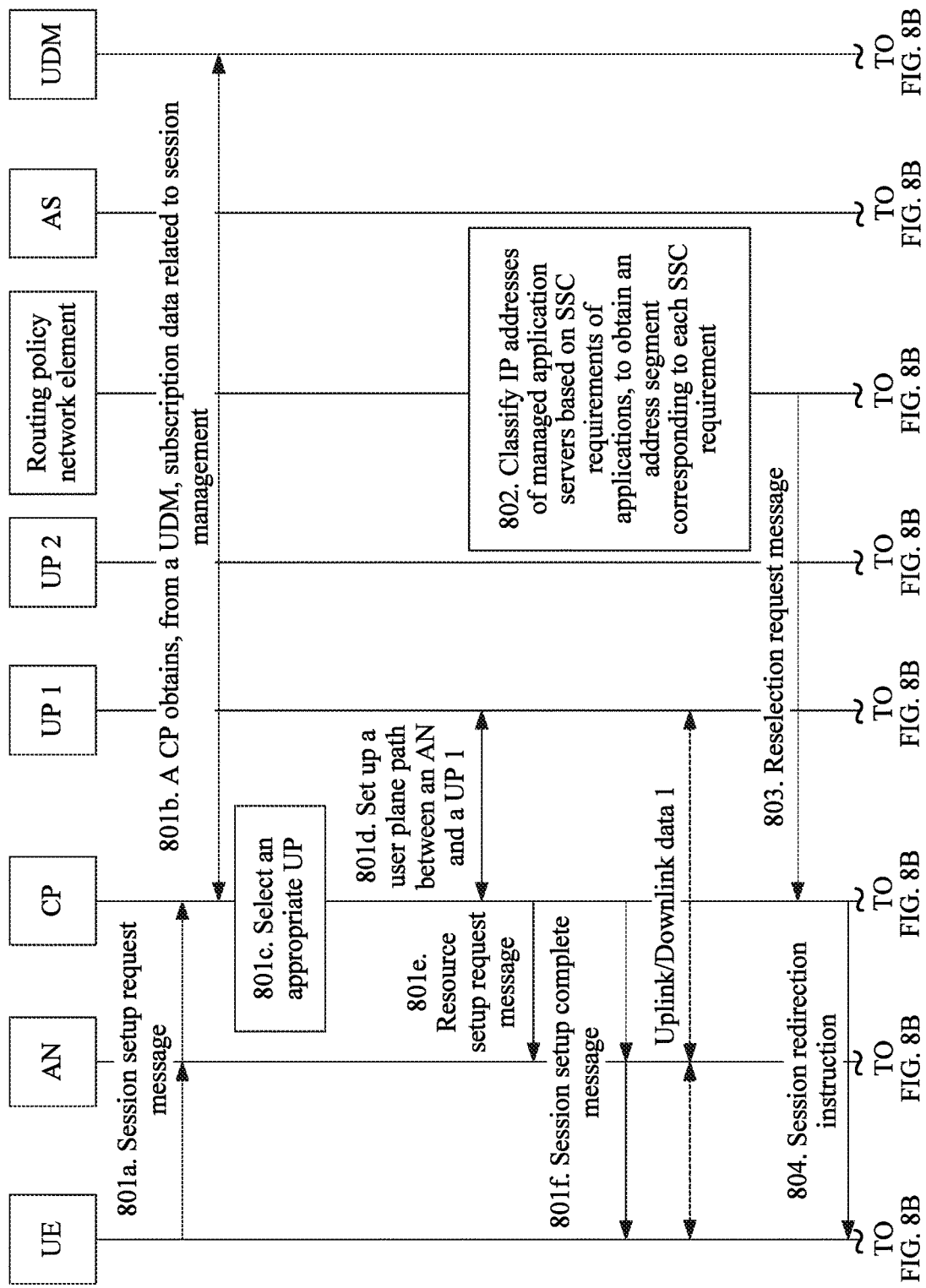
FIG. 8A and FIG. 8B are flowcharts of a communication method according to an embodiment of the present disclosure.
Figure 8B:
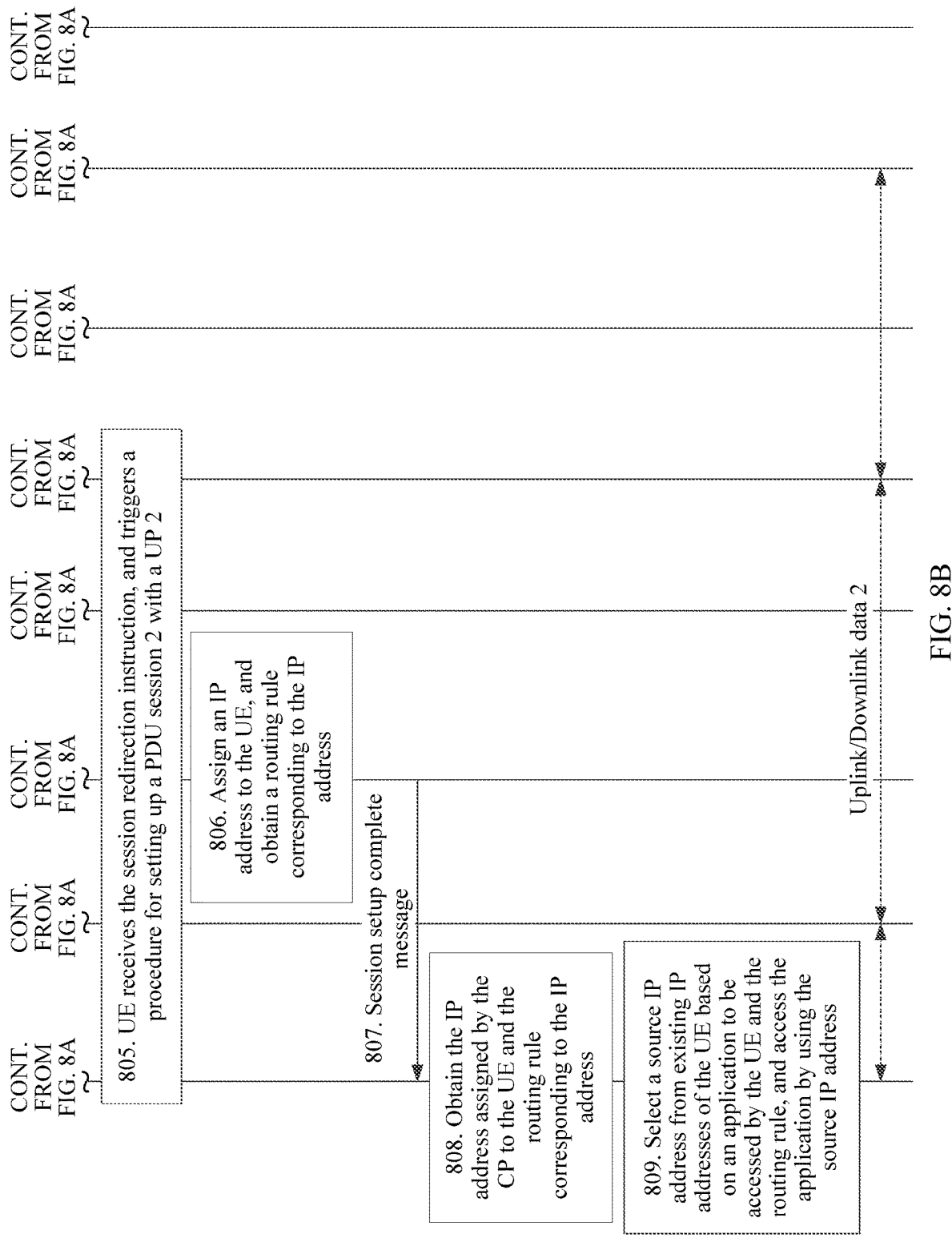

The following describes the two cases separately with reference to embodiments in FIG. 6A and FIG. 6B and in FIG. 8A and FIG. 8B.

FIG. 6A and FIG. 6B are schematic flowcharts of a communication method according to an embodiment of the present disclosure. Referring to FIG. 6A and FIG. 6B, the communication method includes the following steps.

601. UE sets up a PDU session 1 with a UP 1.

For example, step 601 may include the following step 601*a* to step 601*f*.

601*a*. The UE sends a session setup request message to a CP using an AN, where the session setup request message is used to request to set up the PDU session 1.

For example, the session setup request message may carry a type of the PDU session and a data network name, where the type of the PDU session is used to indicate whether an IP address is assigned to the UE in a process of setting up the PDU session, and the data network name is used to indicate a data network to be accessed by the UE.

601*b*. The CP interacts with a unified data management module (UDM), and obtains, from the UDM, subscription data related to session management. The UDM has a function of storing subscription information. Alternatively, the UDM may have another name. This is not limited in this embodiment of the present disclosure.

The subscription data may include an authorized PDU type, an authorized SSC mode, and a default quality of service (QoS) description file.

601*c*. The CP selects an appropriate UP. For example, the CP selects the appropriate UP based on the obtained subscription data. In the example in FIG. 6A, the UP 1 is the appropriate UP selected in step 601*c*.

601*d*. The CP sets up a user plane path between the AN and the UP 1.

601*e*. The CP sends a resource setup request message to the AN to trigger setup of a radio resource between the AN and the UE.

601*f*. The CP sends a session setup complete message to the UE, where the session setup complete message is used to indicate that setup of the PDU session 1 is completed.

After setup of the PDU session 1 is completed, uplink/downlink data may be transmitted among the UE, the AN, and the UP 1, for example, as shown by a data flow of uplink/downlink data 1 in FIG. 6A.

It should be noted that, step 601 may be the process of setting up the PDU session 1 that is initiated after the UE registers with a network. After the PDU session 1 is set up, a location of the UE may change. If the CP detects that the UP 1 is not sufficiently optimized, for example, if a distance between the UP 1 and a current location of the UE exceeds a preset value, to save network resources, a network side may trigger reselection of a UP that is closer to the current location of the UE, set up a new user plane path, and assign a new IP address or IP prefix to the UE. This embodiment of the present disclosure is described using an example in which a routing policy network element triggers reselection of a user plane path, and the CP detects that the UP 1 is not sufficiently optimized and therefore reselects a user plane device to set up the user plane path. Actually, the network side may be caused to trigger reselection of the user plane path for another reason. This is not limited in this embodiment of the present disclosure.

602. The routing policy network element sends a reselection request message to the CP, where the reselection request message is used to request reselect a user plane path.

In this embodiment of the present disclosure, the routing policy network element may trigger the reselection of the user plane path using the reselection request message. In a possible implementation, after receiving the reselection request message, the CP may confirm whether to reselect the user plane path, and send a reselection response message to the routing policy network element.

603. The CP sends a session redirection instruction to the UE, where the session redirection instruction is used to instruct the UE to set up a PDU session 2 with a UP 2.

In this embodiment of the present disclosure, the CP may send the session redirection instruction to the UE to trigger setup of the PDU session 2.

604. The UE receives the session redirection instruction, and triggers a procedure for setting up the PDU session 2 with the UP 2.

After receiving the session redirection instruction, the UE triggers the CP to set up the PDU session 2 with the UP 2. For example, the UE sends a session setup request message to the CP using the AN, the CP obtains, from the UDM, the subscription data related to session management, and the CP selects an appropriate UP. In the example in FIG. 6B, the UP 2 is the appropriate UP selected in this step. For the foregoing steps, refer to steps 601*a* to 601*c*. Details are not described again herein.

605. The CP assigns an IP address to the UE, and obtains a routing rule corresponding to the IP address.

In this embodiment of the present disclosure, the CP can obtain the routing rule from the routing policy network element connected to the CP. The routing rule is an IP address segment of an AS managed by the routing policy network element.

For example, the CP may obtain the routing rule from the routing policy network element using the reselection request message in step 602 of this embodiment. In other words, optionally, the reselection request message in step 602 may carry the routing rule. This is a manner of obtaining the routing rule at a UE granularity.

For another example, the CP may obtain, at any time before step 605, the routing rule from a routing policy network element using another message, or obtain the routing rule from a plurality of routing policy network elements connected to the CP. The manner of obtaining the routing rule may be at a UE granularity, or may be at a device granularity. The device granularity means that the procedure is a procedure independent of a specific UE. For example, before the PDU session 1 or the PDU session 2 is set up, the CP obtains the routing rule from the routing policy network element.

For example, a process of obtaining the routing rule by the CP from the routing policy network element may include the following two implementations:

In the first implementation, the CP may send an obtaining request to the routing policy network element, where the obtaining request is used to request to obtain the routing rule. After receiving the obtaining request, the routing policy network element sends the routing rule to the CP.

In the second implementation, the routing policy network element may actively send the routing rule to the CP.

The CP may obtain the routing rule from the routing policy network element in advance, or may obtain the routing rule from the routing policy network element in real time. This is not limited in this embodiment of the present disclosure.

Optionally, if a new application server is deployed on the routing policy network element, the CP may obtain a routing rule of the new application server using the routing policy network element. For example, the CP may determine, through periodic detection, that a new application server is deployed on the routing policy network element. In this case, the CP actively obtains IP address information of the new application server using the routing policy network element. Certainly, alternatively, when a new application server is deployed, the routing policy network element may actively send IP address information of the new application server to the CP. This is not limited in this embodiment of the present disclosure.

Optionally, a process of obtaining the routing rule by the routing policy network element may include the following two implementations.

In the first implementation, the routing policy network element may send an obtaining request to the application server managed by the routing policy network element, where the obtaining request is used to request to obtain the routing rule, and after receiving the obtaining request, the application server sends the routing rule to the routing policy network element. Optionally, after the routing policy network element receives the routing rule returned by the application server, the routing policy network element may directly or indirectly (for example, using another network element such as a network exposure function (NEF)) save the routing rule in a database (where, for example, the database may be a user data repository (UDR)) in the UDM or a data storage network function (DSF). This implementation is also applicable to a scenario of updating information when a new application server is deployed on the routing policy network element. Details are not described again herein.

In the second implementation, the application server managed by the routing policy network element may actively send the routing rule to the routing policy network element. Optionally, the routing policy network element may directly or indirectly (for example, using another network element such as a network exposure function (NEF)) save the routing rule in the database. This implementation is also applicable to a scenario of updating information when a new application server is deployed on the routing policy network element. Details are not described again herein.

Alternatively, the routing policy network element may obtain the routing rule in another manner, such as configuration. A specific manner of obtaining the routing rule by the routing policy network element is not limited in this embodiment of the present disclosure.

Optionally, from another perspective, a process of obtaining the routing rule by the CP from the routing policy network element may further include the following two implementations:

In the first implementation, the routing policy network element may store the routing rule locally. The CP directly receives the routing rule from the routing policy network element.

In the second implementation, the routing policy network element may directly or indirectly (for example, using another network element such as a NEF) store the routing rule in a database. The CP may directly or indirectly (for example, using another network element such as the NEF) obtain the routing rule from the database.

Optionally, from still another perspective, when the CP is connected to a plurality of routing policy network elements, a process of obtaining the routing rule by the CP may further include the following two implementations.

In the first implementation, the CP interacts with each of the plurality of routing policy network elements to obtain the routing rule. In other words, each routing policy network element provides, for the CP through interaction, an IP address segment of an AS managed by the routing policy network element.

In the second implementation, the plurality of routing policy network elements interact with each other, such that one of the plurality of routing policy network elements can obtain routing rules of the plurality of routing policy network elements. The routing policy network element interacts with the CP, such that the CP can obtain the routing rules of the plurality of routing policy network elements.

Optionally, before the CP assigns the IP address to the UE, the CP may obtain an SSC requirement of an application. If the CP does not obtain the SSC requirement of the application, the CP may assign the IP address to the UE using a preset rule. If the CP obtains the SSC requirement of the application, the CP may assign the IP address to the UE based on the SSC requirement of the application. For example, the CP determines an SSC mode of the PDU session based on the SSC requirement of the application and an application that the UE may access, and assigns an IP address supporting the SSC mode to the UE. For example, the UE may access a plurality of applications at different times, and for a different SSC requirement of each application, determine an SSC mode satisfying the application. A corresponding IP address may be assigned to the UE for the SSC mode.

Optionally, the CP may obtain the SSC requirement of the application using the reselection request message in step

602, or the CP may obtain, at any time before step 605, the SSC requirement of the application from the routing policy network element using another message. Optionally, the routing rule and the SSC requirement of the application may be sent in a same message to the CP, or may be sent in different messages to the CP separately on different occasions. This is not limited in this embodiment of the present disclosure.

In this embodiment of the present disclosure, after assigning the IP address to the UE, the CP obtains the routing rule corresponding to the IP address.

For example, the CP may determine, based on location information of the UE, a routing policy network element closest to the location of the UE. Then the CP selects, from the obtained routing rule, a routing rule obtained from the closest routing policy network element as the routing rule corresponding to the IP address. For example, the routing rule obtained by the CP includes an IP address segment 1 and an IP address segment 2, where the IP address segment 1 is an IP address segment of an application server managed by a routing policy network element 1, and the IP address segment 2 is an IP address segment of an application server managed by a routing policy network element 2. The CP assigns IP 1 to the UE, determines that the routing policy network element closest to the UE is the routing policy network element 1, and therefore determines the IP address segment of the application server managed by the routing policy network element 1 as a routing rule corresponding to the IP 1.

In addition, optionally, the CP may further set up a user plane path between the AN and the UP 2, and send a resource setup request message to the AN. For the foregoing step, refer to steps 601*d* and 601*e*. Details are not described again herein. It should be noted that, the CP may first perform step 605 and then perform the two steps, or may first perform the two steps and then perform step 605, or perform step 605 between the two steps. This is not limited in this embodiment of the present disclosure.

606. The CP sends a session setup complete message to the UE.

Optionally, in a possible implementation, the CP sends, to the UE using the session setup complete message, the IP address assigned by the CP to the UE and the routing rule corresponding to the IP address. In other words, the session setup complete message carries the IP address assigned by the CP to the UE and the routing rule corresponding to the IP address. For example, the implementation is applicable to a scenario of multiple parallel PDU sessions.

In another possible implementation, in a process of setting up the PDU session 2, the CP sends a router advertisement (RA) message to the selected UP 2, and the UP 2 sends the router advertisement message received from the CP to the UE. The RA message carries the IP address assigned by the CP to the UE and the routing rule corresponding to the IP address. For example, the implementation is applicable to a scenario of a multi-homed PDU session.

Optionally, the CP may further send, to the UE, the SSC mode corresponding to the IP address. For example, in the foregoing two implementations, the CP may send, to the UE using the session setup complete message or the router advertisement message, the SSC mode corresponding to the IP address. Optionally, before the CP assigns the IP address to the UE, the CP may further determine whether the PDU session 2 supports reselection of an SSC mode. In other words, the CP determines whether the PDU session 2 supports an SSC mode different from that of the PDU session 1. If the CP determines that the SSC mode different from that of the PDU session 1 is supported, when sending, to the UE, the IP address and the routing rule corresponding to the IP address, the CP may further send the SSC mode corresponding to the IP address.

607. The UE obtains the IP address assigned by the CP to the UE and the routing rule corresponding to the IP address.

For example, according to the foregoing descriptions, the UE may obtain, from the session setup complete message or the router advertisement message, the IP address assigned by the CP to the UE and the routing rule corresponding to the IP address. Optionally, the UE may further obtain, from the session setup complete message or the router advertisement message, the SSC mode corresponding to the IP address.

608. The UE selects a source IP address from existing IP addresses of the UE based on an application to be accessed by the UE and the routing rule, and accesses the application using the source IP address.

For example, the UE selects the source IP address from the existing IP addresses based on an IP address of an application server corresponding to the application to be accessed by the UE and the routing rule. Optionally, the process may include: the UE selects the source IP address according to a preset rule, where the preset rule includes that the IP address of the application server corresponding to the application to be accessed by the UE is in an IP address segment included in a routing rule corresponding to the source IP address.

For example, the UE accesses an application A, and the routing rule corresponding to the IP 1 is the IP address segment 1. If an IP address of an application server 1 corresponding to the application A is in the IP address segment 1 in the routing rule, the UE may select, from the existing IP addresses, the IP 1 corresponding to the IP address segment 1 as the source IP address, and access the application A using the IP 1, that is, communicate with the AS corresponding to the application A using the IP 1. In a process of communication between the UE and the AS, uplink/downlink data may be transmitted among the UE, the AN, the UP 2, and the AS, as shown by uplink/downlink data 2 in FIG. 6B.

In a possible implementation, the UE may further select the source IP address from the existing IP addresses of the UE based on an SSC requirement of the application to be accessed by the UE, the routing rule, and the SSC mode corresponding to the IP address. The process may include: the UE selects the source IP address according to a preset rule, where the preset rule includes that the SSC mode corresponding to the source IP address satisfies the SSC requirement of the application to be accessed by the UE, and the IP address of the application server corresponding to the application to be accessed by the UE is in the IP address segment included in the routing rule.

In the method provided by this embodiment of the present disclosure, the CP obtains the routing rule using the routing policy network element, and determines the routing rule corresponding to the IP address assigned by the CP to the UE. The CP sends, to the UE, the IP address assigned by the CP to the UE and the routing rule corresponding to the IP address, such that the UE can select, based on the application to be accessed and the routing rule, an appropriate source IP address to access the application, thereby improving communication efficiency.

In the example in FIG. 6B, in a process in which the CP triggers the UE to set up the PDU session 2, the CP assigns the IP address to the UE, determines the routing rule corresponding to the IP address, and sends, to the UE, the IP address and the routing rule corresponding to the IP address, such that the UE selects the source IP address. In addition, the present disclosure is further applicable to a scenario of setup of a first PDU session (for example, the PDU session 1 in FIG. 6A) triggered by the UE. Likewise, the CP may assign an IP address to the UE in the process of setting up the PDU session 1 by the CP, determine a routing rule corresponding to the IP address, and send, to the UE, the IP address and the routing rule corresponding to the IP address. A difference between the scenario and setup of a second PDU session (for example, the PDU session 2 in FIG. 6B) lies in that, because the UE has only one IP address (that is, the IP address obtained from the CP), the UE may not select a source IP address.

Referring to FIG. 7, based on interaction among a CP, UE, and a routing policy network element, a communication method in an embodiment of the present disclosure may be described briefly as follows. The routing policy network element classifies IP addresses of managed application servers based on SSC requirements of applications, to obtain an address segment corresponding to each SSC requirement. The CP assigns an IP address to the UE. The CP obtains a routing rule corresponding to the IP address. The CP sends, to the UE, the IP address assigned by the CP to the UE and the routing rule. After the UE obtains the IP address assigned by the CP to the UE and the routing rule, the UE selects a source IP address from existing IP addresses of the UE based on an application to be accessed by the UE and the routing rule, and accesses the application using the source IP address.

The following describes in detail steps of the communication method for this case in an embodiment corresponding to FIG. 8A and FIG. 8B. FIG. 8A and FIG. 8B are schematic flowcharts of a communication method according to an embodiment of the present disclosure. Referring to FIG. 8A and FIG. 8B, the communication method includes the following steps.

801. UE sets up a PDU session 1 with a UP 1.

For step 801, refer to the descriptions about step 601. Details are not described again herein.

802. A routing policy network element classifies IP addresses of managed application servers based on SSC requirements of applications, to obtain an address segment corresponding to each SSC requirement.

For example, the routing policy network element may perform classification in the following two manners.

In the first implementation, first, an address segment is assigned based on each SSC requirement, and then an IP address is assigned, based on an SSC requirement of an application, to an application server corresponding to the application. For example, first, three address segments are assigned, where the three address segments correspond to three SSC requirements respectively. Based on the SSC requirement of the application corresponding to the application server, an address segment from which an address is to be assigned to the application server is determined. For example, if an SSC requirement of an application corresponding to an AS 1 managed by the routing policy network element is an SSC requirement 1, an IP address is assigned to the AS 1 from an address segment corresponding to the SSC requirement 1. Therefore, the routing policy network element may obtain an address segment corresponding to each SSC requirement.

In the second implementation, after the IP addresses are assigned to the AS s, the routing policy network element classifies the IP addresses based on an SSC requirement of an application corresponding to each AS. For example, if an SSC requirement of an application corresponding to an AS 1 managed by the routing policy network element is an SSC requirement 1, an IP address of the AS 1 is classified into a first type, and if an SSC requirement of an application corresponding to an AS 2 managed by the routing policy network element is an SSC requirement 2, an IP address of the AS 2 is classified into a second type. Therefore, the routing policy network element may obtain an address segment corresponding to each SSC requirement. The IP address of each AS in the address segment obtained in this implementation may be discrete.

For example, an address rule obtained after the routing policy network element performs classification is shown in Table 1. In the example in Table 1, an address segment including IP addresses A and B corresponds to the SSC requirement 1, an address segment including IP addresses C and D corresponds to the SSC requirement 2, and an address segment including an IP address E corresponds to an SSC requirement 3.

TABLE 1

| SSC requirement   | Address segment |
|-------------------|-----------------|
| SSC requirement 1 | IP A, and IP B  |
| SSC requirement 2 | IP C, and IP D  |
| SSC requirement 3 | IP E            |

803. When reselection of a user plane path is triggered for a reason, the routing policy network element sends a reselection request message to a CP.

804. The CP sends a session redirection instruction to the UE.

805. The UE receives the session redirection instruction, and triggers a procedure for setting up a PDU session 2 with a UP 2.

For steps 803 to 805, refer to the descriptions about steps 602 to 604 in FIG. 6A and FIG. 6B. Details are not described again herein.

806. The CP assigns an IP address to the UE, and obtains a routing rule corresponding to the IP address.

Similarly, for this step, refer to step 605 in FIG. 6B. A difference between FIG. 8B and FIG. 6B lies in that, in the example in FIG. 8B, the routing rule obtained by the CP from the routing policy network element is a routing rule classified by the routing policy network element based on an SSC requirement. In other words, the routing rule obtained by the CP from the routing policy network element includes an IP address segment of an application server corresponding to applications having a same SSC requirement. For example, the routing rule obtained by the CP from the routing policy network element may include an IP address segment 1 and an IP address segment 2, where the IP address segment 1 is an IP address segment of an application server corresponding to an application whose SSC requirement is an SSC mode 1, and the IP address segment 2 is an IP address segment of an application server corresponding to an application whose SSC requirement is an SSC mode 2.

A manner of obtaining the routing rule by the CP from the routing policy network element and a manner of assigning the IP address are similar to those in FIG. 6B. Details are not described again herein.

After assigning the IP address to the UE, the CP obtains the routing rule corresponding to the IP address.

For example, the CP assigns an IP address supporting the SSC mode 1 to the user equipment based on an obtained session and service continuity requirement (where, for example, the requirement is the SSC mode 1) of an application. In addition, the CP first determines, based on location information of the UE, a routing policy network element closest to a location of the UE. Then the CP uses an address segment that supports the SSC mode 1 in the address segments classified by the routing policy network element (the routing policy network element closest to the location of the UE) and that is in the obtained routing rule as the routing rule corresponding to the IP address. For example, the routing rule obtained by the CP includes an IP address segment 1 and an IP address segment 2, where the two address segments correspond to an SSC requirement that is the SSC mode 1, the IP address segment 1 is an IP address segment of an application server managed by a routing policy network element 1, and the IP address segment 2 is an IP address segment of an application server managed by a routing policy network element 2. The CP assigns IP 1 supporting the SSC mode 1 to the UE, determines that the routing policy network element closest to the UE is the routing policy network element 1, and therefore determines the address segment 1 as a routing rule corresponding to the IP 1.

807. The CP sends a session setup complete message to the UE.

Optionally, in a possible implementation, the CP sends, to the UE using the session setup complete message, the IP address assigned by the CP to the UE and the routing rule corresponding to the IP address. In other words, the session setup complete message carries the IP address assigned by the CP to the UE and the routing rule corresponding to the IP address. For example, the implementation is applicable to a scenario of multiple parallel PDU sessions.

In another possible implementation, in a process of setting up the PDU session 2, the CP sends a router advertisement (RA) message to the selected UP 2, and the UP 2 sends the router advertisement message received from the CP to the UE. The RA message carries the IP address assigned by the CP to the UE and the routing rule corresponding to the IP address. For example, the implementation is applicable to a scenario of a multi-homed PDU session.

808. The UE obtains the IP address assigned by the CP to the UE and the routing rule corresponding to the IP address.

For example, according to the foregoing descriptions, the UE may obtain, from the session setup complete message or the router advertisement message, the IP address assigned by the CP to the UE and the routing rule corresponding to the IP address.

809. The UE selects a source IP address from existing IP addresses of the UE based on an application to be accessed by the UE and the routing rule, and accesses the application using the source IP address.

For example, the UE selects the source IP address from the existing IP addresses based on an IP address of an application server corresponding to the application to be accessed by the UE and the routing rule. Optionally, the process may include: the UE selects the source IP address according to a preset rule, where the preset rule includes that the IP address of the application server corresponding to the application to be accessed by the UE is in an IP address segment included in a routing rule corresponding to the source IP address.

For example, the UE accesses an application A, and the routing rule corresponding to the IP 1 is the IP address segment 1. If an IP address of an application server 1 corresponding to the application A is in the IP address segment 1 in the routing rule, the UE may select, from the existing IP addresses, the IP 1 corresponding to the IP address segment 1 as the source IP address, and access the application A using the IP 1, that is, communicate with the AS corresponding to the application A using the IP 1. Therefore, if an SSC requirement of the application A is the SSC mode 1, the SSC requirement of the application corresponding to the application server in the IP address segment 1 is also the SSC mode 1. In a process of communication between the UE and the AS, uplink/downlink data may be transmitted among the UE, an AN, the UP 2, and the AS, as shown by uplink/downlink data 2 in FIG. 8B.

In the method provided by this embodiment of the present disclosure, the CP obtains the routing rule (where the routing rule includes the IP address segment of the application server corresponding to the applications having the same SSC requirement) using the routing policy network element, and determines the routing rule corresponding to the IP address assigned by the CP to the UE. The CP sends, to the UE, the IP address assigned by the CP to the UE and the routing rule corresponding to the IP address, such that the UE can select, based on the application to be accessed and the routing rule, an appropriate source IP address to access the application, thereby improving communication efficiency.

Figure 9:
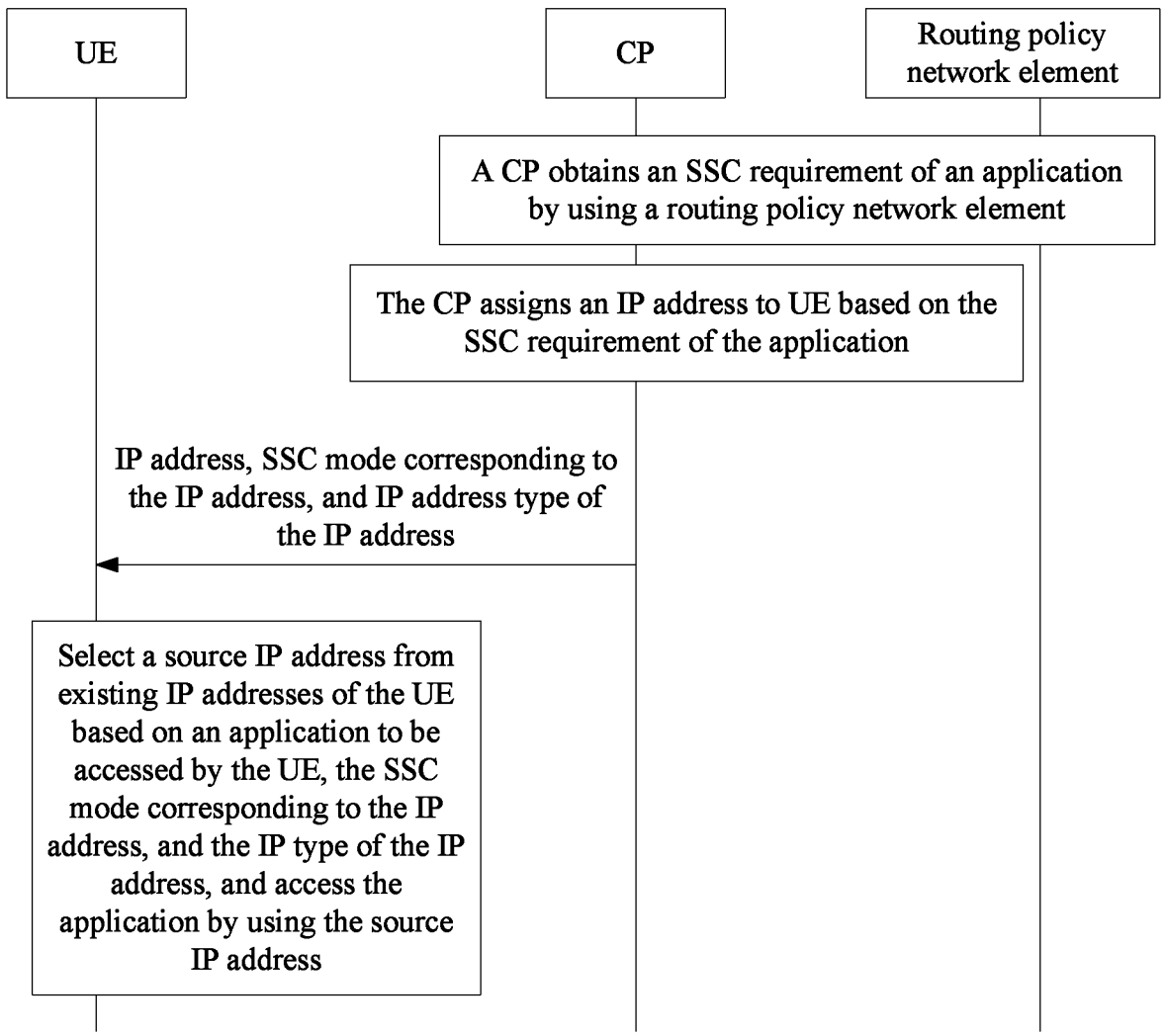
FIG. 9 is a flowchart of a communication method according to an embodiment of the present disclosure.

This application provides a communication method. Referring to FIG. 9, based on interaction among a CP, UE, and a routing policy network element, the communication method in this embodiment of the present disclosure may be described briefly as follows. The CP obtains an SSC requirement of an application using the routing policy network element. The CP assigns an IP address to UE based on the SSC requirement of the application. The CP sends, to the UE, the IP address assigned by the CP to the UE, an SSC mode corresponding to the IP address, and an IP address type of the IP address. After the UE obtains the IP address assigned by the CP to the UE, the SSC mode corresponding to the IP address, and the IP type of the IP address, the UE selects a source IP address from existing IP addresses of the UE based on an application to be accessed by the UE, the SSC mode corresponding to the IP address, and the IP type of the IP address, and accesses the application using the source IP address.

Figure 10A:
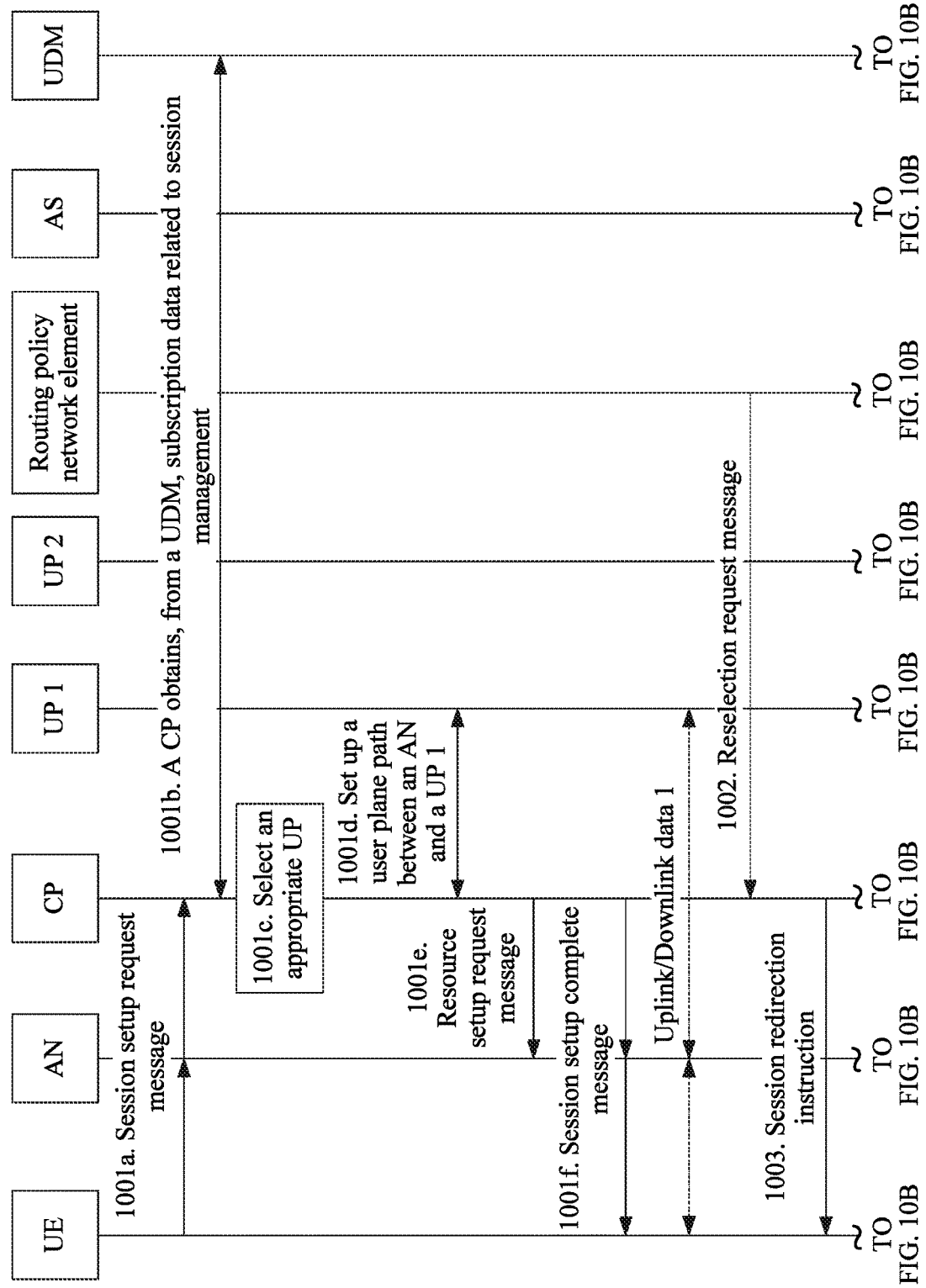
FIG. 10A and FIG. 10B are flowcharts of a communication method according to an embodiment of the present disclosure.
Figure 10B:
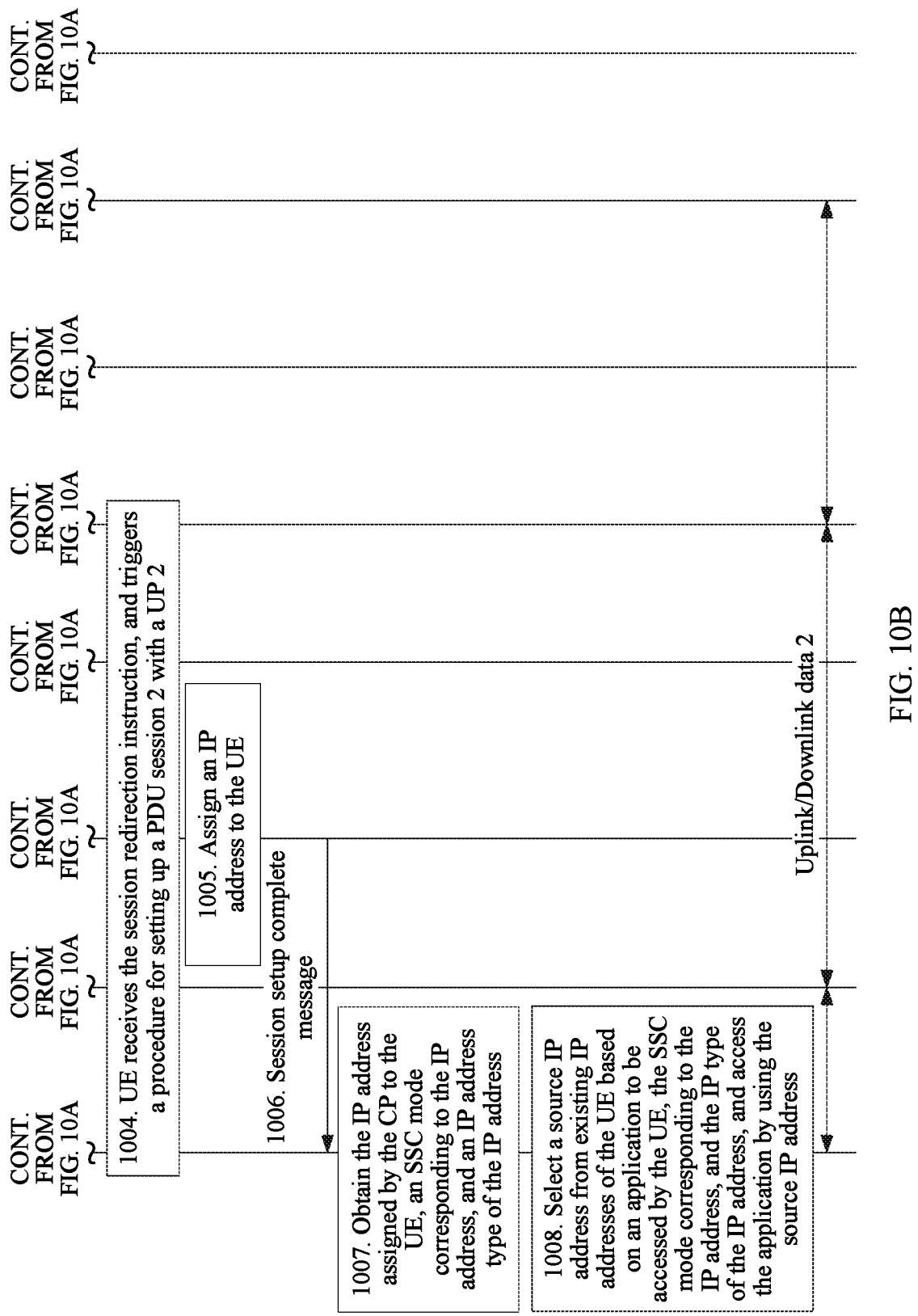

The following describes in detail steps of the communication method for this case in an embodiment corresponding to FIG. 10A and FIG. 10B. FIG. 10A and FIG. 10B are schematic flowcharts of a communication method according to an embodiment of the present disclosure. Referring to FIG. 10A and FIG. 10B, the communication method includes the following steps.

1001. UE sets up a PDU session 1 with a UP 1.

Step 1001 is similar to step 601, and step 1001 may include step 1001a to step 1001f. Details are not described again herein.

1002. A routing policy network element sends a reselection request message to a CP, where the reselection request message is used to request reselect a user plane path.

1003. The CP sends a session redirection instruction to the UE, where the session redirection instruction is used to instruct the UE to set up a PDU session 2 with a UP 2.

1004. The UE receives the session redirection instruction, and triggers a procedure for setting up the PDU session 2 with the UP 2.

Step 1002 to step 1004 are similar to step 602 to step 604. Details are not described again herein.

1005. The CP assigns an IP address to the UE.

In this embodiment of the present disclosure, before the CP assigns the IP address to the UE, the CP may obtain an SSC requirement of an application. The CP may assign the IP address to the UE based on the SSC requirement of the application. For example, the CP determines an SSC mode of a PDU session based on the SSC requirement of the application and an application that the UE may access, and assigns an IP address supporting the SSC mode to the UE. For example, the UE may access a plurality of applications at different times, and for a different SSC requirement of each application, determine an SSC mode satisfying the application. A corresponding IP address may be assigned to the UE for the SSC mode.

Optionally, the CP may obtain the SSC requirement of the application using the reselection request message in step 1002, or the CP may obtain, at any time before step 1005, the SSC requirement of the application from the routing policy network element using another message.

1006. The CP sends a session setup complete message to the UE.

In this embodiment of the present disclosure, after the CP assigns the IP address to the UE, the CP may send, to the UE, the IP address assigned by the CP to the UE, the SSC mode corresponding to the IP address, and an IP type of the IP address. The IP type may include a local type and a remote type. An IP address complying with the local type may be used to access a local network, and an IP address complying with the remote type may be used to access a remote network.

In a possible implementation, the CP sends, to the UE using the session setup complete message, the IP address assigned by the CP to the UE, the SSC mode corresponding to the IP address, and the IP type of the IP address. In other words, the session setup complete message carries the IP address assigned by the CP to the UE, the SSC mode corresponding to the IP address, and the IP type of the IP address. For example, the implementation is applicable to a scenario of multiple parallel PDU sessions.

In another possible implementation, in a process of setting up the PDU session 2, the CP sends a RA message to the selected UP 2, and the UP 2 sends the router advertisement message received from the CP to the UE. The RA message carries the IP address assigned by the CP to the UE, the SSC mode corresponding to the IP address, and the IP type of the IP address. For example, the implementation is applicable to a scenario of a multi-homed PDU session.

1007. The UE obtains the IP address assigned by the CP to the UE, the SSC mode corresponding to the IP address, and the IP type of the IP address.

For example, according to the foregoing descriptions, the UE may obtain, from the session setup complete message or the router advertisement message, the IP address assigned by the CP to the UE, the SSC mode corresponding to the IP address, and the IP type corresponding to the IP address.

1008. The UE selects a source IP address from existing IP addresses of the UE based on an application to be accessed by the UE, the SSC mode corresponding to the IP address, and the IP type of the IP address, and accesses the application using the source IP address.

For example, the UE selects the source IP address from the existing IP addresses of the UE based on an SSC requirement of the application to be accessed by the UE, the SSC mode corresponding to the IP address, and the IP type of the IP address. Optionally, the process may include: the UE selects the source IP address according to a preset rule, where the preset rule includes that an SSC mode corresponding to the source IP address satisfies the SSC requirement of the application to be accessed by the UE, and that an IP type of the source IP address complies with a requirement on the IP type of the source IP address. For example, if a local application needs to be accessed, a source IP address of a local type needs to be selected.

For example, the UE accesses an application A, where an SSC requirement of the application A is an SSC mode 1, and the requirement on the IP type of the source IP address is an IP type 1. If IP 1 corresponds to the SSC mode 1, and an IP type of the IP 1 is the IP type 1, the UE may select, from the existing IP addresses, the IP 1 as the source IP address, and access the application A using the IP 1, that is, communicate with an application server corresponding to the application A using the IP 1.

In the method provided by this embodiment of the present disclosure, the CP obtains the SSC requirement of the application using the routing policy network element, determines the SSC mode of the PDU session based on the SSC requirement of the application, assigns the IP address supporting the SSC mode to the UE, and sends, to the UE, the IP address assigned by the CP to the UE, the SSC mode corresponding to the IP address, and the IP type of the IP address, such that the UE can select, based on the application to be accessed, the SSC mode corresponding to the IP address, and the IP type of the IP address, an appropriate source IP address to access the application, thereby improving communication efficiency.

Figure 11:
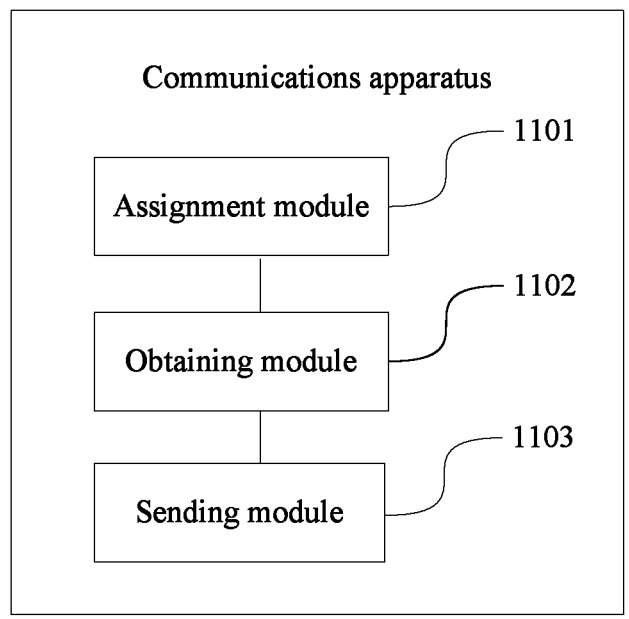
FIG. 11 is a schematic structural diagram of a communications apparatus according to an embodiment of the present disclosure.

FIG. 11 is a schematic structural diagram of a communications apparatus according to an embodiment of the present disclosure. The communications apparatus may be configured to perform a method on a control plane device side in the foregoing embodiments shown in FIG. 5 to FIG. 10A and FIG. 10B. For example, referring to FIG. 11, the apparatus includes an assignment module 1101, an obtaining module 1102, and a sending module 1103.

The assignment module 1101 is configured to assign an IP address to user equipment.

The obtaining module 1102 is configured to obtain, using a routing policy network element, a routing rule corresponding to the IP address.

The sending module 1103 is configured to send the routing rule and the IP address to the user equipment, where the routing rule is used by the user equipment to determine a source IP address when the user equipment initiates a service.

Figure 12:
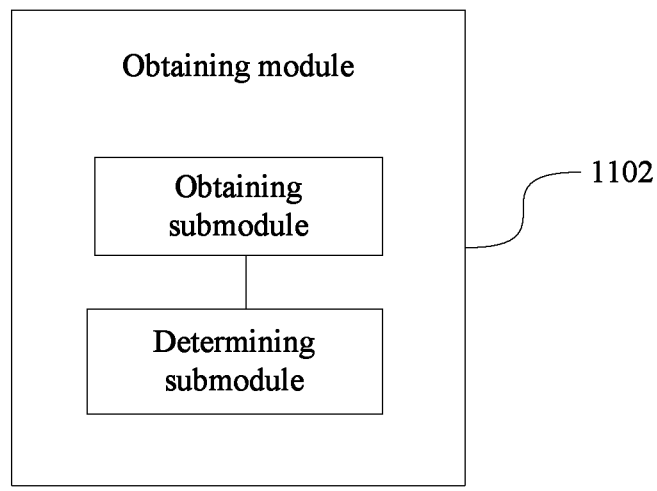
FIG. 12 is a schematic structural diagram of an obtaining module 1102 according to an embodiment of the present disclosure.

In a possible implementation, referring to FIG. 12, the obtaining module 1102 includes: an obtaining submodule configured to obtain at least one routing rule using the routing policy network element; and a determining submodule configured to determine, based on the assigned IP address, the routing rule corresponding to the IP address.

In a possible implementation, the obtaining submodule is configured to obtain the at least one routing rule from the routing policy network element. Alternatively, the obtaining submodule is configured to obtain the at least one routing rule from a database, where the at least one routing rule is saved in the database by the routing policy network element.

In a possible implementation, the routing rule includes an IP address segment of an application server managed by the routing policy network element.

In a possible implementation, the routing rule includes an IP address segment of an application server corresponding to applications having a same session and service continuity requirement.

In this embodiment of the present disclosure, a control plane device may obtain, using the routing policy network element, the routing rule corresponding to the IP address assigned by the control plane device to the user equipment, and send the routing rule and the IP address to the user equipment, such that the user equipment can select, based on the routing rule, an appropriate source IP address to access the application, thereby improving communication efficiency.

In addition, the control plane device may further obtain a session and service continuity requirement of the application from the routing policy network element, and assign the IP address to the user equipment. In this way, a method for assigning the IP address is provided, and communication efficiency is improved.

Figure 13:
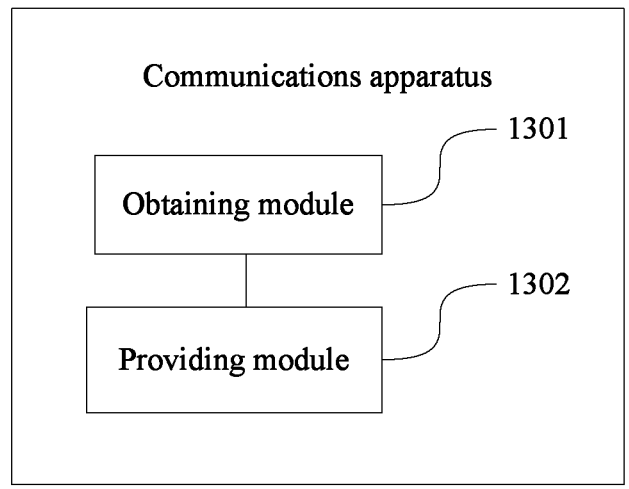
FIG. 13 is a schematic structural diagram of a communications apparatus according to an embodiment of the present disclosure.

FIG. 13 is a schematic structural diagram of a communications apparatus according to an embodiment of the present disclosure. The communications apparatus may be configured to perform a method on a routing policy network element side in the foregoing embodiments shown in FIG. 5 to FIG. 10A and FIG. 10B. For example, referring to FIG. 13, the apparatus includes an obtaining module 1301 and a providing module 1302.

The obtaining module 1301 is configured to obtain a routing rule.

The providing module 1302 is configured to provide the routing rule for a control plane device.

In a possible implementation, the providing module 1302 is configured to save the routing rule in a database, such that the control plane device obtains the routing rule from the database; or the providing module 1302 is configured to send the routing rule to the control plane device.

In a possible implementation, the obtaining module 1301 is further configured to perform a process of obtaining an IP address segment of an application server corresponding to applications having a same session and service continuity requirement in step 802.

In a possible implementation, the routing rule includes an IP address segment of an application server managed by a routing policy network element. Alternatively, the routing rule includes the IP address segment of the application server corresponding to the applications having the same session and service continuity requirement.

In this embodiment of the present disclosure, the routing policy network element may obtain the routing rule and provide the routing rule for the control plane device; and the control plane device may send the routing rule to user equipment, such that the user equipment can select, based on the routing rule, an appropriate source IP address to access the application, thereby improving communication efficiency.

In addition, the routing policy network element may obtain a session and service continuity requirement of the application, and send the session and service continuity requirement of the application to the control plane device, such that the control plane device can assign an IP address to the user equipment based on the session and service continuity requirement. In this way, a method for assigning the IP address is provided, and communication efficiency is improved.

Figure 14:
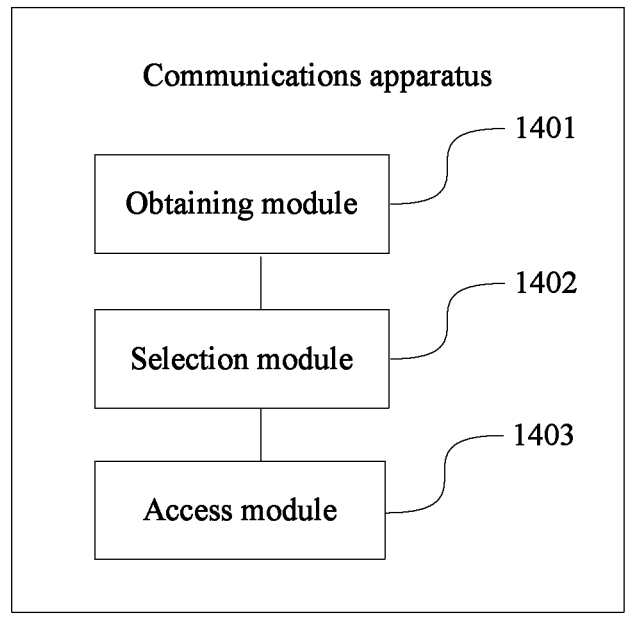
FIG. 14 is a schematic structural diagram of a communications apparatus according to an embodiment of the present disclosure.

FIG. 14 is a schematic structural diagram of a communications apparatus according to an embodiment of the present disclosure. The communications apparatus may be configured to perform a method on a user equipment side in the foregoing embodiments shown in FIG. 5 to FIG. 10A and FIG. 10B. For example, referring to FIG. 14, the apparatus includes an obtaining module 1401, a selection module 1402, and an access module 1403.

The obtaining module 1401 is configured to obtain an IP address of user equipment, a routing rule, and a session and service continuity mode corresponding to the IP address.

The selection module 1402 is configured to select a source IP address from existing IP addresses of the user equipment based on an application to be accessed by the user equipment, the routing rule, and the session and service continuity mode corresponding to the IP address.

The access module 1403 is configured to access the application using the source IP address.

In a possible implementation, the routing rule includes an IP address segment of an application server managed by a routing policy network element.

In a possible implementation, the obtaining module 1401 is configured to perform a process of obtaining, from a control plane device, the IP address of the user equipment, the routing rule, and the session and service continuity mode corresponding to the IP address in step 607.

The selection module 1402 is configured to perform a process of selecting the source IP address in step 608.

In this embodiment of the present disclosure, the user equipment may obtain the IP address, the routing rule, and the session and service continuity mode corresponding to the IP address, such that the user equipment can select, based on the application to be accessed, the routing rule, and the session and service continuity mode corresponding to the IP address, an appropriate source IP address to access the application, thereby improving communication efficiency.

It should be noted that, during communication by the communications apparatus provided in the foregoing embodiment, division of the foregoing function modules is used as an example for description. In actual application, the foregoing functions can be allocated to different function modules and implemented according to a requirement, that is, an internal structure of the apparatus is divided into different function modules to implement all or some of the functions described above. In addition, the communications apparatus provided in the foregoing embodiment and the communication method embodiment pertain to a same concept. For an implementation process, refer to the method embodiment, and details are not described again herein.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instruction may be stored in a computer-readable storage medium, or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

The foregoing descriptions are merely optional embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A communication method, comprising:
assigning, by a control plane device, an Internet Protocol (IP) prefix to a user equipment;
obtaining, by the control plane device using a routing policy network element, a routing rule corresponding to the IP prefix, wherein the routing rule is determined based on a session and service continuity (SSC) requirement of an application, and wherein the routing rule comprises an IP segment of an application server (AS) corresponding to applications having a same SSC requirement; and
sending, by the control plane device, the routing rule and the IP prefix to the user equipment, wherein the routing rule is for the user equipment to determine a source IP prefix when the user equipment initiates a service.

2. The communication method of claim 1, wherein obtaining, by the control plane device using the routing policy network element, the routing rule corresponding to the IP prefix comprises:
obtaining, by the control plane device, at least one routing rule using the routing policy network element; and
determining, by the control plane device based on the IP prefix, the routing rule corresponding to the IP prefix.

3. The communication method of claim 2, wherein obtaining, by the control plane device, at least one routing rule using the routing policy network element comprises obtaining, by the control plane device, the at least one routing rule from the routing policy network element.

4. The communication method of claim 2, wherein obtaining, by the control plane device, at least one routing rule using the routing policy network element comprises obtaining, by the control plane device, the at least one routing rule from a database, and wherein the at least one routing rule is saved in the database by the routing policy network element.

5. The communication method of claim 1, wherein the routing rule comprises an IP prefix segment of an AS managed by the routing policy network element.

6. The communication method of claim 1, further comprising:
obtaining, by the control plane device, an SSC requirement of an application using the routing policy network element; and
assigning, by the control plane device, the IP prefix to the user equipment based on the SSC requirement of the application.

7. The communication method of claim 6, further comprising sending, by the control plane device to the user equipment, an SSC mode corresponding to the IP prefix, wherein the SSC requirement, is such that when the service is accessing the application, uninterrupted transmission of the service is maintained even when a location of the user equipment changes while accessing the application.

8. The communication method of claim 7, wherein the SSC requirement is such that when the service is accessing the application, uninterrupted transmission of the service is maintained even when a location of the user equipment changes while accessing the application.

9. The communication method of claim 1, wherein sending, by the control plane device, the routing rule and the IP prefix to the user equipment comprises sending, by the control plane device, a session setup complete message to the user equipment, wherein the session setup complete message carries the routing rule and the IP prefix, and wherein the session setup complete message indicates to the user equipment that setup of a packet data unit (PDU) session is complete.

10. The communication method of claim 1, wherein sending, by the control plane device, the routing rule and the IP prefix to the user equipment comprises sending, by the control plane device, a router advertisement (RA) message to the user equipment using a user plane device, wherein the RA message carries an SSC mode of a packet data unit (PDU) session, the routing rule, and the IP prefix, and wherein the SSC mode comprises at least one of SSC mode 1, SSC mode 2, or SSC mode 3.

11. A communication method, comprising:
obtaining, by a user equipment, an Internet Protocol (IP) prefix of the user equipment, a routing rule, and a session and service continuity (SSC) mode corresponding to the IP prefix, wherein the routing rule is determined based on an SSC requirement of an application, and wherein the routing rule comprises an IP segment of an application server (AS) corresponding to applications having a same SSC requirement;
selecting, by the user equipment, a source IP prefix from existing IP prefixes of the user equipment based on an application to be accessed by the user equipment, the routing rule, and the SSC mode corresponding to the IP prefix; and
accessing the application using the source IP prefix.

12. The communication method of claim 11, wherein the routing rule comprises an IP prefix segment of an AS managed by a routing policy network element.

13. The communication method of claim 11, wherein obtaining, by the user equipment, the IP prefix of the user equipment, the routing rule, and the SSC mode corresponding to the IP prefix comprises obtaining, by the user equipment from a control plane device, the IP prefix of the user equipment, the routing rule, and the SSC mode corresponding to the IP prefix.

14. The communication method of claim 13, wherein selecting, by the user equipment, the source IP prefix from existing IP prefixes of the user equipment based on the application to be accessed by the user equipment, the routing rule, and the SSC mode corresponding to the IP prefix comprises selecting, by the user equipment, the source IP prefix from the existing IP prefixes of the user equipment based on an SSC requirement of the application to be accessed by the user equipment, the routing rule, and the SSC mode corresponding to the IP prefix.

15. The communication method of claim 14, wherein selecting, by the user equipment, the source IP prefix from the existing IP prefixes of the user equipment based on the SSC requirement of the application to be accessed by the user equipment, the routing rule, and the SSC mode corresponding to the IP prefix comprises selecting, by the user equipment, the source IP prefix according to a preset rule, and wherein the preset rule specifies that an SSC mode corresponding to the source IP prefix satisfies the SSC requirement of the application to be accessed by the user equipment and that an IP prefix of an AS corresponding to the application to be accessed by the user equipment is in an IP prefix segment comprised in the routing rule.

16. The communication method of claim 11, wherein obtaining,
by the user equipment, the IP prefix of the user equipment, the routing rule, and the SSC mode corresponding to the IP prefix comprises receiving, by the user equipment, a session setup complete message from a control plane device, wherein the session setup complete message carries the IP prefix, the routing rule, the SSC mode corresponding to the IP prefix, and an IP address type, wherein before accessing the application, the communication method further comprises selecting, by the user equipment, a source IP address based on the IP address type, wherein the source IP address is of a local type when the application to be accessed by the user equipment is a local application, and wherein the source IF address is of a remote type when the application to be accessed by the user equipment is a remote application.

17. The communication method of claim 11, wherein obtaining, by the user equipment, the IP prefix of the user equipment, the routing rule, and the SSC mode corresponding to the IP prefix comprises receiving, by the user equipment, a router advertisement (RA) message from a user plane device, and wherein the RA message carries the IP prefix, the routing rule, and the SSC corresponding to the IP prefix.

18. A communications apparatus, comprising:
a processor; and
a non-transitory computer-readable storage medium storing a program to be executed by the processor, the program including instructions such that when executed by the processor, cause the communications apparatus to:
obtain an Internet Protocol (IP) prefix of a user equipment, a routing rule, and a session and service (SSC) mode corresponding to the IP prefix, wherein the routing rule is determined based on an SSC requirement of an application, and wherein the routing rule comprises an IP segment of an application server (AS) corresponding to applications having a same SSC requirement;
select a source IP prefix from existing IP prefixes of the user equipment based on an application to be accessed by the user equipment, the routing rule, and the SSC mode corresponding to the IP prefix; and
access the application using the source IP prefix.

19. The communications apparatus of claim 18, wherein the routing rule comprises an IP prefix segment of an AS managed by a routing policy network element.

20. The communications apparatus of claim 18, wherein the program includes instructions to:
obtain, from a control plane device, a session setup complete message carrying the IP prefix of the user equipment, the routing rule, and the SSC mode corresponding to the IP prefix; and
select the source IP prefix from the existing IP prefixes of the user equipment based on an SSC requirement of the application to be accessed by the user equipment, the routing rule, and the SSC mode corresponding to the IP prefix, wherein the user equipment is the communications apparatus.

* * * * *

UNITED STATES PATENT AND TRADEMARK OFFICE
CERTIFICATE OF CORRECTION

PATENT NO. : 11,258,708 B2
APPLICATION NO. : 16/561163
DATED : February 22, 2022
INVENTOR(S) : Yang et al.

Page 1 of 1

It is certified that error appears in the above-identified patent and that said Letters Patent is hereby corrected as shown below:

On the Title Page

Item (56) References Cited, Other Publications, Line 1: "Routing rulesconfiguration." should read "Routing rules configuration."

In the Claims

Claim 7, Column 29, Line 54: "requirement, is such" should read "requirement is such"

Claim 16, Column 31, Line 9: "source IF address" should read "source IP address"

Signed and Sealed this
Nineteenth Day of April, 2022

Katherine Kelly Vidal
*Director of the United States Patent and Trademark Office*